United States Patent
Ginsberg et al.

(10) Patent No.: US 10,198,942 B2
(45) Date of Patent: Feb. 5, 2019

(54) TRAFFIC ROUTING DISPLAY SYSTEM WITH MULTIPLE SIGNAL LOOKAHEAD

(71) Applicant: Connected Signals, Inc., Eugene, OR (US)

(72) Inventors: Matthew L. Ginsberg, Eugene, OR (US); Peter Jordan Flier, Eugene, OR (US); Martin C. Drohmann, Eugene, OR (US); Timothy S. Stirling, Henrico, VA (US)

(73) Assignee: Connected Signals, Inc., Eugene, OR (US)

( * ) Notice: Subject to any disclaimer, the term of this patent is extended or adjusted under 35 U.S.C. 154(b) by 0 days.

(21) Appl. No.: 15/804,630

(22) Filed: Nov. 6, 2017

(65) Prior Publication Data
US 2018/0075739 A1 Mar. 15, 2018

Related U.S. Application Data

(63) Continuation-in-part of application No. 15/473,177, filed on Mar. 29, 2017, and a continuation-in-part of
(Continued)

(51) Int. Cl.
*G08G 1/01* (2006.01)
*G01C 21/34* (2006.01)
(Continued)

(52) U.S. Cl.
CPC ........... *G08G 1/0133* (2013.01); *B60K 35/00* (2013.01); *G01C 21/3492* (2013.01);
(Continued)

(58) Field of Classification Search
CPC .... G08G 1/0133; G08G 1/012; G08G 1/0145; G08G 1/04; G08G 1/052;
(Continued)

(56) References Cited

U.S. PATENT DOCUMENTS 4,713,767 A  12/1987 Sato et al.
4,731,613 A   3/1988 Endo et al.
(Continued)

FOREIGN PATENT DOCUMENTS

CN  101093168 A  12/2007
CN  101118559 A   2/2008
(Continued)

OTHER PUBLICATIONS

Antony, J. and Suchetha, M., Vision Based Vehicle Detection: A Literature Review, International Journal of Applied Engineering Research, vol. 11, No. 5, 2016, pp. 3128-3133, Research India Publications.
(Continued)

*Primary Examiner* — Sisay Yacob
(74) *Attorney, Agent, or Firm* — Fenwick & West LLP

(57) ABSTRACT

A traffic routing display system provides a visual display of a speed or series of speeds suggested to the driver such that the driver may pass through multiple consecutive traffic signal devices without stopping at a red light. In one aspect, the display depicts the expected state of an upcoming traffic light. In another aspect, the display is an icon colored to correspond to the expected state. In another aspect, the time remaining before the state of a traffic light changes is displayed. The effect that an indicator has on driver behavior is used to determine the type of indicator to provide to the driver. Certain indicators may not be displayed by the system depending on the effect they have on the driver.

16 Claims, 16 Drawing Sheets

Related U.S. Application Data application No. 15/076,116, filed on Mar. 21, 2016, now Pat. No. 9,852,624, said application No. 15/473,177 is a continuation-in-part of application No. 14/820,345, filed on Aug. 6, 2015, now abandoned, said application No. 15/076,116 is a continuation-in-part of application No. 13/542,938, filed on Jul. 6, 2012, now Pat. No. 10,083,607, which is a continuation-in-part of application No. 13/352,013, filed on Jan. 17, 2012, now abandoned, which is a continuation-in-part of application No. 12/886,100, filed on Sep. 20, 2010, now abandoned, which is a continuation-in-part of application No. 12/821,349, filed on Jun. 23, 2010, now abandoned, which is a continuation-in-part of application No. 12/639,770, filed on Dec. 16, 2009, now abandoned.

(60) Provisional application No. 62/419,187, filed on Nov. 8, 2016, provisional application No. 62/106,146, filed on Jan. 21, 2015, provisional application No. 61/233,123, filed on Aug. 11, 2009.

(51) Int. Cl.
*G08G 1/052* (2006.01)
*G01C 21/36* (2006.01)
*G08G 1/0968* (2006.01)
*B60K 35/00* (2006.01)
*G08G 1/04* (2006.01)
*G08G 1/0967* (2006.01)

(52) U.S. Cl.
CPC ......... *G01C 21/3697* (2013.01); *G08G 1/012* (2013.01); *G08G 1/0145* (2013.01); *G08G 1/04* (2013.01); *G08G 1/052* (2013.01); *G08G 1/09675* (2013.01); *G08G 1/096716* (2013.01); *G08G 1/096741* (2013.01); *G08G 1/096775* (2013.01); *G08G 1/096783* (2013.01); *G08G 1/096816* (2013.01); *G08G 1/096833* (2013.01); *G08G 1/096883* (2013.01); *B60K 2350/965* (2013.01)

(58) Field of Classification Search
CPC ....... G08G 1/096716; G08G 1/096741; G08G 1/09675; G08G 1/096775; G08G 1/096783; G08G 1/096816; G08G 1/096833; G08G 1/09688; B60K 35/00; B60K 2350/965; G01C 21/3492; G01C 21/3697
See application file for complete search history.

(56) References Cited

U.S. PATENT DOCUMENTS

| | | |
|---|---|---|
| 4,882,689 A | 11/1989 | Aoki |
| 4,903,212 A | 2/1990 | Yokouchi et al. |
| 4,926,336 A | 5/1990 | Yamada |
| 4,994,971 A | 2/1991 | Poelstra |
| 5,060,162 A | 10/1991 | Ueyama et al. |
| 5,087,919 A | 2/1992 | Odagawa et al. |
| 5,155,688 A | 10/1992 | Tanaka et al. |
| 5,179,519 A | 1/1993 | Adachi et al. |
| 5,272,483 A | 12/1993 | Kato |
| 5,272,638 A | 12/1993 | Martin et al. |
| 5,307,277 A | 4/1994 | Hirano |
| 5,313,200 A | 5/1994 | Sone |
| 5,374,933 A | 12/1994 | Kao |
| 5,383,127 A | 1/1995 | Shibata |
| 5,390,125 A | 2/1995 | Sennott et al. |
| 5,416,712 A | 5/1995 | Geier et al. |
| 5,442,559 A | 8/1995 | Kuwahara et al. |
| 5,469,158 A | 11/1995 | Morita |
| 5,469,360 A | 11/1995 | Ihara et al. |
| 5,485,161 A | 1/1996 | Vaughn |
| 5,488,559 A | 1/1996 | Seymour |
| 5,493,291 A | 2/1996 | Bruggemann |
| 5,504,482 A | 4/1996 | Schreder |
| 5,523,765 A | 6/1996 | Ichikawa |
| 5,530,651 A | 6/1996 | Uemura et al. |
| 5,537,323 A | 7/1996 | Schulte |
| 5,546,311 A | 8/1996 | Sekine |
| 5,552,990 A | 9/1996 | Ihara et al. |
| 5,608,391 A | 3/1997 | Bantli et al. |
| 5,689,423 A | 11/1997 | Sawada |
| 5,699,056 A | 12/1997 | Yoshida |
| 5,739,772 A | 4/1998 | Nanba et al. |
| 5,740,049 A | 4/1998 | Kaise |
| 5,742,923 A | 4/1998 | Odagawa |
| 5,771,484 A | 6/1998 | Tognazzini |
| 5,774,824 A | 6/1998 | Streit et al. |
| 5,821,880 A | 10/1998 | Morimoto et al. |
| 5,831,551 A | 11/1998 | Geduld |
| 5,839,087 A | 11/1998 | Sato |
| 5,847,661 A | 12/1998 | Ricci |
| 5,848,373 A | 12/1998 | DeLorme et al. |
| 5,852,791 A | 12/1998 | Sato et al. |
| 5,862,511 A | 1/1999 | Croyle et al. |
| 5,890,682 A | 4/1999 | Welk |
| 5,910,789 A | 6/1999 | Vigen |
| 5,925,090 A | 7/1999 | Poonsaengsathit |
| 5,940,010 A | 8/1999 | Sasaki et al. |
| 5,941,934 A | 8/1999 | Sato |
| 5,948,042 A | 9/1999 | Heimann et al. |
| 5,949,375 A | 9/1999 | Ishiguro et al. |
| 5,951,620 A | 9/1999 | Ahrens et al. |
| 5,959,577 A | 9/1999 | Fan et al. |
| 5,982,298 A | 11/1999 | Lappenbusch et al. |
| 5,987,378 A | 11/1999 | Schipper et al. |
| 5,999,878 A | 12/1999 | Hanson et al. |
| 6,008,740 A | 12/1999 | Hopkins |
| 6,035,253 A | 3/2000 | Hayashi et al. |
| 6,047,234 A | 4/2000 | Cherveny et al. |
| 6,049,303 A | 4/2000 | Biacs et al. |
| 6,057,785 A | 5/2000 | Guthrie |
| 6,067,502 A | 5/2000 | Hayashida et al. |
| 6,078,865 A | 6/2000 | Koyanagi |
| 6,084,543 A | 7/2000 | Iizuka |
| 6,122,593 A | 9/2000 | Friederich et al. |
| 6,144,916 A | 11/2000 | Wood et al. |
| 6,150,961 A | 11/2000 | Alewine et al. |
| 6,151,550 A | 11/2000 | Nakatani |
| 6,173,232 B1 | 1/2001 | Nanba et al. |
| 6,240,364 B1 | 5/2001 | Kerner et al. |
| 6,246,948 B1 | 6/2001 | Thakker |
| 6,252,544 B1 | 6/2001 | Hoffberg |
| 6,253,150 B1 | 6/2001 | Nakamura |
| 6,269,303 B1 | 7/2001 | Watanabe et al. |
| 6,285,875 B1 | 9/2001 | Alajoki et al. |
| 6,298,302 B2 | 10/2001 | Walgers et al. |
| 6,317,058 B1 | 11/2001 | Lemelson et al. |
| 6,317,685 B1 | 11/2001 | Kozak et al. |
| 6,317,686 B1 | 11/2001 | Ran |
| 6,333,703 B1 | 12/2001 | Alewine et al. |
| 6,338,021 B1 | 1/2002 | Yagyu et al. |
| 6,343,301 B1 | 1/2002 | Halt et al. |
| 6,351,709 B2 | 2/2002 | King et al. |
| 6,353,785 B1 | 3/2002 | Shuman et al. |
| 6,353,796 B1 | 3/2002 | Schipper et al. |
| 6,356,839 B1 | 3/2002 | Monde et al. |
| 6,360,165 B1 | 3/2002 | Chowdhary |
| 6,381,533 B1 | 4/2002 | Crane et al. |
| 6,466,862 B1 | 10/2002 | DeKock et al. |
| 6,472,977 B1 | 10/2002 | Pöchmüller |
| 6,515,596 B2 | 2/2003 | Awada |
| 6,516,267 B1 | 2/2003 | Cherveny et al. |
| 6,516,273 B1 | 2/2003 | Pierowicz et al. |
| 6,526,352 B1 | 2/2003 | Breed et al. |
| 6,535,140 B1 | 3/2003 | Goss et al. |
| 6,539,300 B2 | 3/2003 | Myr |
| 6,553,308 B1 | 4/2003 | Uhlmann et al. |

(56) References Cited

U.S. PATENT DOCUMENTS

| | | |
|---|---|---|
| 6,574,550 B2 | 6/2003 | Hashida |
| 6,577,946 B2 | 6/2003 | Myr |
| 6,615,135 B2 | 9/2003 | Davies |
| 6,621,420 B1 | 9/2003 | Poursartip |
| 6,633,238 B2 | 10/2003 | Lemelson et al. |
| 6,675,085 B2 | 1/2004 | Straub |
| 6,708,085 B2 | 3/2004 | Yamane et al. |
| 6,708,107 B2 | 3/2004 | Impson et al. |
| 6,711,493 B1 | 3/2004 | Andrews et al. |
| 6,741,933 B1 | 5/2004 | Glass |
| 6,751,549 B1 | 6/2004 | Kozak |
| 6,785,606 B2 | 8/2004 | DeKock et al. |
| 6,801,638 B1 | 10/2004 | Janssen et al. |
| 6,801,850 B1 | 10/2004 | Wolfson |
| 6,850,841 B1 | 2/2005 | Casino |
| 6,853,913 B2 | 2/2005 | Cherveny et al. |
| 6,882,930 B2 | 4/2005 | Trayford et al. |
| 6,931,322 B2 | 8/2005 | Jung et al. |
| 6,941,220 B2 | 9/2005 | Le et al. |
| 6,941,221 B2 | 9/2005 | Draeger et al. |
| 6,989,766 B2 | 1/2006 | Mese et al. |
| 6,992,598 B2 | 1/2006 | Poltorak |
| 7,053,780 B1 | 5/2006 | Straub et al. |
| 7,079,946 B2 | 7/2006 | Hunzinger |
| 7,162,367 B2 | 1/2007 | Lin et al. |
| 7,239,962 B2 | 7/2007 | Plutowski |
| 7,366,606 B2 | 4/2008 | Uyeki |
| 7,382,274 B1 | 6/2008 | Kermani et al. |
| 7,432,826 B2 | 10/2008 | Schwartz |
| 7,433,889 B1 | 10/2008 | Barton |
| 7,466,227 B2 | 12/2008 | Chen et al. |
| 7,477,984 B2 | 1/2009 | Zhang et al. |
| 7,522,940 B2 | 4/2009 | Jendbro et al. |
| 7,589,643 B2 | 9/2009 | Dagci et al. |
| 7,680,588 B2 | 3/2010 | Tsukamoto |
| 7,818,116 B1 | 10/2010 | Nesbitt |
| 7,912,637 B2 | 3/2011 | Horvitz et al. |
| RE42,807 E | 10/2011 | Harris |
| 8,040,254 B2 | 10/2011 | Delia et al. |
| 8,102,253 B1 | 1/2012 | Brady |
| 8,427,303 B1 | 4/2013 | Brady et al. |
| 8,576,069 B2 | 11/2013 | Nadeem et al. |
| 2001/0001848 A1 | 5/2001 | Oshizawa et al. |
| 2001/0020213 A1 | 9/2001 | Hatano |
| 2001/0029425 A1 | 10/2001 | Myr |
| 2001/0050620 A1 | 12/2001 | Lee |
| 2002/0008637 A1* | 1/2002 | Lemelson ............... G08G 1/07 340/907 |
| 2002/0067289 A1 | 6/2002 | Smith |
| 2002/0120390 A1 | 8/2002 | Bullock |
| 2002/0126023 A1 | 9/2002 | Awada |
| 2003/0016143 A1 | 1/2003 | Ghazarian |
| 2003/0060977 A1 | 3/2003 | Jijina et al. |
| 2003/0069683 A1* | 4/2003 | Lapidot ............... G01C 21/34 701/117 |
| 2003/0078720 A1 | 4/2003 | Adachi |
| 2003/0128135 A1 | 7/2003 | Poltorak |
| 2003/0191568 A1 | 10/2003 | Breed |
| 2004/0030670 A1 | 2/2004 | Barton |
| 2004/0130442 A1 | 7/2004 | Breed et al. |
| 2004/0189489 A1 | 9/2004 | Terui |
| 2004/0267440 A1 | 12/2004 | DeKock et al. |
| 2005/0134478 A1* | 6/2005 | Mese ............... G08G 1/096716 340/901 |
| 2005/0143889 A1* | 6/2005 | Isaji ............... G08G 1/161 701/70 |
| 2005/0149259 A1 | 7/2005 | Cherveny et al. |
| 2005/0187701 A1 | 8/2005 | Baney |
| 2005/0227696 A1 | 10/2005 | Kaplan et al. |
| 2005/0283312 A1 | 12/2005 | Taliwal |
| 2006/0095199 A1 | 5/2006 | Lagassey |
| 2006/0247070 A1 | 11/2006 | Funk et al. |
| 2006/0265294 A1 | 11/2006 | de Sylva |
| 2006/0282214 A1 | 12/2006 | Wolterman |
| 2006/0293852 A1 | 12/2006 | Tsurumi |
| 2007/0001830 A1 | 1/2007 | Dagci et al. |
| 2007/0005240 A1 | 1/2007 | Oumi et al. |
| 2007/0010942 A1 | 1/2007 | Bill |
| 2007/0021905 A1 | 1/2007 | Takashima et al. |
| 2007/0027583 A1 | 2/2007 | Tamir et al. |
| 2007/0038362 A1 | 2/2007 | Gueziec |
| 2007/0103341 A1 | 5/2007 | Kreiner et al. |
| 2007/0208492 A1 | 9/2007 | Downs et al. |
| 2007/0222638 A1 | 9/2007 | Chen et al. |
| 2007/0225912 A1 | 9/2007 | Grush |
| 2007/0249428 A1 | 10/2007 | Pendleton et al. |
| 2007/0270120 A1 | 11/2007 | Zhang et al. |
| 2008/0004789 A1 | 1/2008 | Horvitz et al. |
| 2008/0082251 A1 | 4/2008 | Ishikawa et al. |
| 2008/0094250 A1 | 4/2008 | Myr |
| 2008/0180281 A1 | 7/2008 | Bilimoria et al. |
| 2008/0218380 A1 | 9/2008 | Wall et al. |
| 2008/0249713 A1 | 10/2008 | Sessions |
| 2008/0275629 A1 | 11/2008 | Yun |
| 2009/0005984 A1 | 1/2009 | Bradley |
| 2009/0070031 A1 | 3/2009 | Ginsberg |
| 2009/0088965 A1 | 4/2009 | Burckart et al. |
| 2009/0118017 A1 | 5/2009 | Perlman et al. |
| 2009/0138187 A1 | 5/2009 | Mathias |
| 2009/0138189 A1 | 5/2009 | Kim et al. |
| 2009/0157613 A1* | 6/2009 | Strohmenger ......... G06Q 10/06 |
| 2009/0180553 A1 | 7/2009 | Araki et al. |
| 2010/0094583 A1 | 4/2010 | Borean et al. |
| 2010/0131443 A1 | 5/2010 | Agarwal et al. |
| 2010/0145569 A1 | 6/2010 | Bourque et al. |
| 2010/0171640 A1 | 7/2010 | Delia et al. |
| 2011/0037618 A1 | 2/2011 | Ginsberg et al. |
| 2011/0037619 A1 | 2/2011 | Ginsberg et al. |
| 2011/0040621 A1 | 2/2011 | Ginsberg et al. |
| 2012/0139754 A1 | 6/2012 | Ginsberg et al. |
| 2012/0274481 A1 | 11/2012 | Ginsberg et al. |
| 2013/0120581 A1 | 5/2013 | Daniels et al. |
| 2013/0166109 A1 | 6/2013 | Ginsberg |
| 2013/0184985 A1* | 7/2013 | Bollars ............... G01C 21/36 701/410 |
| 2014/0301600 A1 | 10/2014 | Marty et al. |

FOREIGN PATENT DOCUMENTS

| | | |
|---|---|---|
| EP | 1 288 883 | 5/2003 |
| JP | 08-269921 A | 10/1996 |
| JP | 2009/245326 A | 10/2009 |
| KR | 10-1458190 B1 | 7/2012 |
| WO | WO 2005/019000 A1 | 3/2005 |
| WO | WO 2007-035878 A2 | 3/2007 |

OTHER PUBLICATIONS

Aoude, G. et al., "Behavior Classification Algorithms at Intersections and Validation using Naturalistic Data," Jul. 2011, six pages. [Online] [Retrieved Jun. 5, 2012] Retrieved from the Internet <URL:http://acl.mit.edu/papers/IV11AoudeDesarajuLaurensHow.pdf.>.

Apple, J. et al., Green Driver: AI in a Microcosm, Proceedings of the Twenty-Fifth MAI Conference on Artificial Intelligence, 2011, pp. 1311-1316.

Australian Government, IP Australia, Patent Examination Report No. 1, Australian Patent Application No. 2010282926, dated Nov. 28, 2013, three pages.

Ballard, D. H., Generalizing the Hough Transform to Detect Arbitrary Shapes, Pattern Recognition, 13{2), 1981, pp. 111-122.

Barnes, D., Maddern, w., and Posner, I., Exploiting 3D Semantic Scene Priors for Online Traffic Light Interpretation, Proceedings of the IEEE Intelligent Vehicles Symposium (IV), 2015, six pages ,Soeul, South Korea.

Chiang, C.-C., Ho, M.-C., Liao, H.-S., Pratama, A., & Syu, W.-C., Detecting and Recognizing Traffic Lights by Genetic Approximate Ellipse Detection and Spatial Texture Layouts, *International Journal of Innovative Computing, Information and Control*, Dec. 2011, vol. 7, No. 12, pp. 6919-6934.

(56) References Cited

OTHER PUBLICATIONS

De Charetie, R., and Nashashibi, F., Real Time Visual Traffic Lights Recognition Based on Spot Light Detection and Adaptive Traffic Lights Templates, Intelligent Vehicles Symposium. IV, pp. 358-363, Xi'an: IEEE.

Diaz, M., Cerri, P., Pirlo, G., Ferrer, M. A., & Impedovo, D., A Survey on Traffic Light Detection, Conference: New Trends in Image Analysis and Processing—ICIAP 2015 Workshops, Lecture Notes in Computer Science (LNCS) 9281, pp. 1-8, Springer International Publishing Switzerland.

Diaz-Cabrera, M., Cerri, P., and Medici, P., Robust real-time traffic light detection and distance estimation using a single camera, Expert Systems with Applications 42, 2015, pp. 3911-3923.

Diaz-Cabrera, M., Cerri, P., and Sanchez-Medina, J., Suspended Traffic Lights Detection and Distance Estimation Using Color Features, 15th International IEEE Conference on Intelligent Transportation Systems, 2012, pp. 1315-1320.

European Patent Office, Examination Report, European Patent Application No. 10808489.8, dated Nov. 14, 2013, five pages.

European Patent Office, Supplementary European Search Report and Opinion, European Patent Application No. 10808489.8, dated Feb. 22, 2013, nine pages.

Faezipour, M. et al., "Progress and Challenges in Intelligent Vehicle Area Networks," Communications of the ACM, Feb. 2012, pp. 90-100, vol. 55, No. 2.

Fairfield, N. and Urmson, C., Traffic Light Mapping and Detection, International Conference on Robotics and Automation {ICRA), 2011, pp. 5421-5426, IEEE.

Ginsberg, M., Traffic Signals and Autonomous Vehicles: Vision-based or a V2I Approach? Intelligent Transporation Systems, ITSA-16, 2016, eleven pages, San Jose, CA.

gminsidenews.com, "DCS Preps Safety System to Prevent Red-Light Running," Jun. 18, 2006, eleven pages. [Online] [Retrieved Jan. 23, 2012] Retrieved from the Internet <URL:http://www.qminsidenews.com/forums/f58/dcx-preps-safety-system-prevent-red-light-running-32921/.>.

Gong, J. et al., The Recognition and Tracking of Traffic Lights Based on Color Segmentation and CAMSHIFT for Intelligent Vehicles, 2010 IEEE Intelligent Vehicles Symposium, Jun. 201, five pages.

Haltakov, V., Mayr, J., Unger, C., and Ilic, S., Semantic Segmentation Based Traffic Light Detection at Day and at Night, Pattern Recognition, Lecture Notes in Computer Science (LNCS) 9358, Oct. 2015, pp. 446-457.

Harris, C. and Stephens, M., A Combined Corner and Edge Detector, Proceedings of Fourth Alvey Vision Conference, 15, 1988, pp. 147-151, Plessey Research Roke Manor, United Kingdom.

Hosseinyalmadary, S. and Yilmaz, A., Traffic Light Detection Using Conic Section Geometry, ISPRS Annals of the Photogrammetry, Remote Sensing and Spatial Information Sciences, vol. 111-1, Jul. 2016, pp. 191-200.

Inman, V. et al., "The Effects of in-Vehicle and Infrastructure-Based Collision Warning at Signalized Intersections," Federal Highway Administration (FHWA), Publication No. FHWA-HRT-09-049, Dec. 2009, forty-six pages. [Online] [Retrieved Jan. 23, 2012] Retrieved from the Internet <URL:http://www.fhwa.dot.gov/publications/research/safety/09049/09049.pdf.>.

Intelligent Transportation Society of America, "Transportation, Rebirth!: Migration to Vehicle Infrastructure Integration (VII)," VII Technology Showcase and ITS America VII Initiative Outreach Program, Date Unknown, twenty-seven pages. [Online] [Retrieved Jan. 23, 2012] Retrieved from the Internet <URL:http://fortworth.texite.org/Site.Files/TexITE%20presentationMay07.pdf.>.

Intellione Technologies Corp., "io-locate: Strike While the Customer is Near," 2009 [Online] fRetrieved Aug. 16, 20101 Retrieved from the Internet URL:http://www.intellione.com/ioLocate.html>.

Intellione Technologies Corp., "io-traffic: Traffic Data at the Speed of Business," 2008 [Online] [Retrieved Aug. 16, 2010] Retrieved from the Internet URL:http://www.intellione.com/io-traffic_information_sheet.pdf>.

Intellione Technologies Corp., "io-vector: Beat Traffic at Its Own Game," 2008 [Online] [Retrieved Aug. 16, 2010] Retrieved from the Internet URL:http://www.intellione.com/iovector_information_sheet.pdf>.

Jensen, M., Philipsen, M., M!Zlgelmose, A., Moeslund, T. B., and Trivedi, M. M., Vision for Looking at Traffic Lights: Issues, Survey, and Perspectives. IEEE Transactions on Intelligent Transportation Systems, vol. 17, No. 7, 2016, sixteen pages.

John, V., Yoneda, K., Qi, B., Liu, Z., & Mita, S., Traffic Light Recognition in Varying Illumination using Deep Learning and Saliency Map, International Conference on Intelligent Transportation Systems, 2014, pp. 2286-2291, IEEE.

Kim, H.-K. et al., Night-Time Traffic Light Detection Based on SVM with Geometric Moment Features, International Journal of Computer, Electrical, Automation, Control and Information Engineering, 2013, vol. 7, No. 4, pp. 472-475.

Levinson, J. et al., Traffic Light Mapping, Localization, and State Detection for Autonomous Vehicles, 2011 IEEE International Conference on Robotics and Automation {ICRA}, eight pages, IEEE.

Lewis, J. P., Fast Template Matching, Vision Interface 95, Canadian Image Processing and Pattern Recognition Society, May 1995, pp. 120-123.

Maile, M. et al., "Cooperative Intersection Collision Avoidance System for Violations (CICAS-V) for Avoidance of Violation-Based Intersection Crashes," Mercedes-Benz Research & Development North America, Inc., USA, Paper No. 09-0118, 2009, fourteen pages. [Online] [Retrieved Jun. 5, 2012] Retrieved from the Internet <URL:http://www-nrd.nhtsa.dot.gov/pdf/esv/esv21/09-0118.pdf.>.

Michael, M. and Schlipsing, M., Extending Traffic Light Recognition: Efficient Classification of Phase and Pictogram, 2015 International Joint Conference on Neural Netorks (IJCNN), 2015, pp. 1-8, IEEE.

More, J., The Levenberg-Marquardt algorithm: Implementation and theory, Conference on Numerical Analysis, 1978, pp. 105-116.

Omachi, M., and Omachi, S., Traffic Light Detection with Color and Edge Information, International Conference on Computer Science and Information Technology, 2009, pp. 284-287, IEEE.

PCT International Search Report and Written Opinion for PCT/US2016/013956, dated May 18, 2016, 10 Pages.

PCT International Search Report and Written Opinion, PCT Application No. PCT/US2010/038863, dated Aug. 17, 2010, 10 pages.

PCT International Search Report and Written Opinion, PCT Application No. PCT/US2011/040279, dated Oct. 13, 2011, six pages.

PCT International Search Report and Written Opinion, PCT Application No. PCT/US2013/21235, dated Feb. 1, 2013, ten paaes.

PCT International Search Report and Written Opinion, PCT Application No. PCT/US2013/21235, dated Feb. 1, 2013, ten pages.

Philipsen, M., Jensen, M., Trivedi, M., M!Zlgelmose, A., & Moeslund, T., Ongoing Work on Traffic Lights: Detection and Evaluation, 12th IEEE International Conference on Advanced Video and Signal based Surveillance, 2015, six pages, IEEE.

Shi, X., Zhao, N., and Xia, Y., Detection and classification of traffic lights for automated setup of road surveillance systems, Multimedia Tools and Applications, 2016, vol. 75, pp. 12547-12562, Springer Science+Business Media New York.

Siogkas, G. et al., Traffic Lights Detection in Adverse Conditions Using Color, Symmetry and Spatiotemporal Information, International Conference on Computer Vision Theory and Applications (VISAPP 2012), pp. 620-627.

State Intellectual Property Office of the People's Republic of China, First Office Action, Chinese Patent Application No. 201080043533.8, dated Nov. 27, 2013, forty-seven pages.

Strauss, S. "Traffic Magic," University Affairs, Dec. 7, 2009 [Online] [Retrieved Aug. 17, 2010] Retrieved from the Internet URL:http://www.universityaffairs.ca/Print.aspx?id=7102>.

Taiwan Intellectual Property Office, Office Action, Taiwanese Patent Application No. 100121872, dated Sep. 16, 2013, fourteen pages.

United States Office Action, U.S. Appl. No. 12/639,770, dated Oct. 23, 2013, 30 pages.

United States Office Action, U.S. Appl. No. 12/639,770, dated Oct. 24, 2012, 31 Pages.

United States Office Action, U.S. Appl. No. 12/821,349, dated Jun. 20, 2013, 23 pages.

(56) References Cited

OTHER PUBLICATIONS

United States Office Action, U.S. Appl. No. 12/821,349, dated Nov. 2, 2012, 17 Pages.
United States Office Action, U.S. Appl. No. 12/821,349, dated Oct. 23, 2013, 26 pages.
United States Office Action, U.S. Appl. No. 12/886,100, dated Oct. 15, 2013, 12 pages.
United States Office Action, U.S. Appl. No. 12/886,100, dated Dec. 31, 2012, 15 pages.
United States Office Action, U.S. Appl. No. 13/352,013, dated Dec. 17, 2012, 21 Pages.
United States Office Action, U.S. Appl. No. 13/352,013, dated Jun. 21, 2013, 21 pages.
United States Office Action, U.S. Appl. No. 13/352,013, dated Oct. 23, 2013, 13 pages.
United States Office Action, U.S. Appl. No. 13/372,391, dated Dec. 18, 2012, 17 Pages.
United States Office Action, U.S. Appl. No. 13/372,391, dated Dec. 30, 2013, 17 pages.
United States Office Action, U.S. Appl. No. 13/372,391, dated Jul. 8, 2013, 19 pages.
United States Office Action, U.S. Appl. No. 13/425,707, dated Jan. 22, 2014, ten pages.
United States Office Action, U.S. Appl. No. 13/452,938, dated Dec. 28, 2012, 30 Pages.
United States Office Action, U.S. Appl. No. 13/542,938, dated Aug. 16, 2013, 34 pages.
United States Office Action, U.S. Appl. No. 13/542,938, dated Mar. 27, 2014, 39 pages.
United States Office Action, U.S. Appl. No. 13/747,145, dated Jun. 5, 2014, 13 pages.
United States Office Action, U.S. Appl. No. 13/772,941, dated Jan. 31, 2014, 24 pages.
United States Office Action, U.S. Appl. No. 13/772,941, dated Jul. 22, 2013, 16 pages.
United States Office Action, U.S. Appl. No. 14/820,345, dated Apr. 21, 2017, 15 Pages.
Viola, P., and Jones, M., Robust Real-time Object Detection, Cambridge Research Laboratory Technical Report Series, Feb. 2001, thirty pages.
Wang, C., Jin, T., Yang, M., and Wang, B., Robust and Real-Time Traffic Lights Recognition in Complex Urban Environments, International Journal of Computational Intelligence Systems, vol. 4, No. 6, 2011, pp. 1383-1390.
Wang, W. et al., Traffic lights detection and recognition based on multi-feature fusion, *Multimedia Tools and Applications*, Oct. 13, 2016, eighteen pages, Springer Science+Business Media New York.
Webpage for Hawk-Eye Innovations, Hawk-Eye Innovations Ltd., 2015, 2 Pages [online] [Retrieved on Jan. 19, 2016] Retrieved from the internet <URL:http://www.hawkeyeinnovations.eo.uk/>.
Wu, X. et al., Vehicular Communications Using DSRC: Challenges, Enhancements, and Evolution, IEEE Journal on Selected Areas in Communications/Supplement, vol. 31, No. 9, Sep. 2013, pp. 399-408.
Yang, X., Zhao, Z., and Kim, Y., A Real Time Traffic Light Recognition System, International Journal of Information Acquisition, 2008, vol. 5, No. 2, pp. 149-161, World Scientific Publishing Company.
Zeng, X., Tao, C., and Chen, Z., The application of DSRC technology in Intelligent Transportation System. /ET International Communication Conference on Wireless Mobile and Computing {CCWMC}, 2009, pp. 265-268, IEEE.
Zhang, Y., Xue, J., Zhang, G., Zhang, Y., & Zheng, N., A Multi-Feature Fusion Based Traffic Light Recognition Algorithm for Intelligent Vehicles, Proceedings of the 33rd Chinese Control Conference {CCC}, 2014, pp. 4924-4929, IEEE.
Zhou, X., Yuan, J., & Liu, H., A Traffic Light Recognition Algorithm Based on Compressive Tracking, International Journal of Hybrid Information Technology, 2015, vol. 8, No. 6, pp. 323-332.

\* cited by examiner

TRAFFIC ROUTING DISPLAY SYSTEM WITH MULTIPLE SIGNAL LOOKAHEAD

RELATED APPLICATIONS

This application claims priority from U.S. Provisional Patent Application Ser. No. 62/419,187, filed Nov. 8, 2016, entitled "Traffic Routing Display System with Multiple Signal Lookahead," and is a continuation in part of co-pending U.S. patent application Ser. No. 15/076,116, filed Mar. 21, 2016, which is a continuation in part of Ser. No. 13/542,938, filed Jul. 6, 2012, which is a continuation in part of Ser. No. 13/352,013, filed Jan. 17, 2012, which is a continuation in part of Ser. No. 12/886,100, filed Sep. 20, 2010, which is a continuation in part of Ser. No. 12/821,349, filed Jun. 23, 2010, which is a continuation in part of Ser. No. 12/639,770, filed Dec. 16, 2009, which claims the benefit of 61/233,123, filed Aug. 11, 2009. This application is also a continuation in part of U.S. patent application Ser. No. 15/473,177, filed Mar. 29, 2017, which is a continuation in part of Ser. No. 14/820,345, filed Aug. 6, 2015, which claims the benefit of 62/106,146, filed Jan. 21, 2015. All of the above-identified applications are incorporated herein by reference as if fully set forth herein.

FIELD

The present disclosure relates generally to traffic control systems and traffic routing.

BACKGROUND

Significant reductions in vehicle emissions can be achieved, congestion can be limited, safety can be enhanced and travel times reduced by helping commuters and other drivers choose uncongested routes to their destinations. Numerous schemes have been proposed in the past for informing drivers of traffic conditions and presenting them with proposed alternatives when congestion is found. For example, traffic helicopters have been used for decades by radio stations to spot areas of congestion and suggest alternate paths that drivers may wish to consider.

With the growing popularity of GPS and hand-held computing devices, particularly those connected to cellular networks or the internet, other approaches have been used, such as graphical representations of maps with routes being color-coded to indicate levels of congestion.

Another approach to the traffic congestion problem involves "smart" traffic signals. For instance, railroad crossings have for decades been tied to traffic signals to help ease the flow of traffic on routes adjacent to railroad crossings when a train approaches. Further, certain systems have been installed that allow emergency vehicles such as fire trucks to change the state of a light from red to green so that the emergency vehicle can cross the intersection quickly with, rather than against, the signal.

In still another related area, various attempts have been made to collect traffic information from drivers who have, for example, GPS-enabled smartphones with them in their vehicles. Typically, such drivers do not find sufficient incentive to start up, and keep running, an application that will transmit their speed and location information to a remote traffic database.

It would be advantageous to have a display system that takes full advantage of the integration of technologies that are available to report traffic information to drivers and suggest routes based on that information, to communicate with traffic signals, and to collect traffic information from drivers. It would also be beneficial to take advantage of targeted advertising opportunities that such technologies can provide. Further, it would be advantageous to provide a system that enhances driver safety by reducing speeding while still taking advantage of advanced routing capabilities.

Significant effort has been put into mapping and predicting traffic signal status. For example, vehicle-mounted cameras may be used to determine the presence and location of traffic signals, as discussed in U.S. application Ser. No. 15/473,177, filed Mar. 29, 2017 and titled "An Efficient, High-Resolution System and Method to Detect Traffic Lights." However, it may be difficult for such cameras to accurately distinguish light emanating from traffic signals from similarly colored lights in surrounding areas. This introduces significant risk that the detection will be insufficient for modern requirements, such as due to false positives (e.g., falsely detecting a green light) or false negatives (e.g., not detecting an upcoming red light) and renders the camera an unreliable source for traffic signal mapping. Further, building a global database of traffic signal states requires continuous observation, which may be impossible to obtain with vehicle-mounted cameras absent massive penetration.

For reasons other than determining states of traffic signals, many municipalities have installed public or semi-public webcam systems to allow interested parties to observe activities and weather conditions in various locations. Some such systems are fixed in their orientation while others are moveable, whether constantly panning, under control of municipal operators, or otherwise. At times, some such webcam systems may include within a field of view one or more traffic signals or other traffic controls (e.g. presence of a human traffic officer directing traffic at an intersection), or include other visual clues indicating the state of a traffic signal. While municipal and other cameras mounted or aimed at traffic signals are known to exist, no known systems for predicting traffic signal status have included, as an input, related data from webcam systems, such as an image showing a current state of a traffic signal. It would be advantageous to provide a system that enhances driver safety by automatically processing such available information.

SUMMARY

A traffic routing display system includes a destination display, a routing display, and a settings display. The display system is used in conjunction with a routing system providing communications among vehicles and traffic controls, such as traffic signals. In one aspect, a traffic light receives a signal that a vehicle is approaching and in response turns green to allow the vehicle to pass without impairment. In another aspect, a vehicle receives a signal or a series of signals to adjust a current rate of speed to pass through a single traffic light or multiple consecutive traffic signals without stopping at a red light. In still another aspect, a combination of congestion, emergency traffic, roadwork, accidents, weather and similar factors influence proposed routes sent to vehicles.

In a further aspect, a routing system generates a visual display that includes suggested speeds for a vehicle based on a current location of the vehicle and a selected destination of the vehicle. Specifically, the routing system determines a travel route for the vehicle based on the current location and the selected destination of the vehicle. Traffic signal information that comprises a current status of traffic signal devices that are located along the determined travel route is obtained. Based on this traffic signal information, the routing system determines an optimal speed profile for the vehicle. In some embodiments, the optimal speed profile comprises a range of speeds required for the vehicle to pass through at least two consecutive traffic signal devices along the travel route without stopping. The optimal speed profile for the vehicle, as well as the travel route for the vehicle, are sent to a user device associated with the vehicle.

In a further aspect, a speed display system comprises computer processors and a display system. The display system comprises a first portion and a second portion. The first portion of the display system contains at least two concentric arcs. Each concentric arc indicates a range of speed required for a vehicle to pass through, without stopping, one of two consecutive traffic signals along a travel route. The second portion of the display system contains a traffic signal indicator. The traffic signal indicator indicates a status of a first upcoming traffic signal of the at least two consecutive traffic signals. In instances where a particular speed will not allow the vehicle to pass through a first traffic signal, the display artificially omits information regarding the second traffic signal so as not to confuse the driver.

In a further aspect, the routing system generates a mapping for a traffic light that describes the color of the traffic signal as a function of time. In one embodiment, the mapping is based on traffic signal status information received via one or more public webcams and/or input from a user through a user device. The traffic light mapping indicates the status of a traffic light and timing and types of signal changes that occur at different times of day and different days of the week. Once generated, the mapping can be used by the routing module to prepare routing and speed instructions for user devices and predict the status of an upcoming traffic light.

In a further aspect, a vehicle operator is presented with a display of a predicted state of a traffic light that varies with intensity as the prediction becomes more certain. In yet another aspect, the routing system changes an existing route based on changes in the predicted state of one or more traffic signals, for instance due to unanticipated pedestrian requests for a "walk" state of a traffic light. By maintaining information of interest to vehicle operators during approach, the operators are provided incentive to continue use of the system in an ongoing manner that permits collection of the vehicle's real-time speed and location data for related traffic reporting and routing purposes.

The display system used with this routing system includes a destination display that provides a driver with a simple way to either select a destination or indicate a "cruising" mode with no specific destination.

The display system also includes a routing display that dynamically provides traffic signal indicators for traffic signals along an expected route of the driver. The routing display also shows the driver the current speed limit and whether the driver is exceeding that limit. In one aspect, the routing display includes large circular icons representing the states of upcoming traffic signals; in one aspect the icons display the current states of the traffic signals and in another aspect the icons display the predicted states of the traffic signals at the time the driver is expected to reach each light. In another aspect, colored bars are also displayed showing expected times of arrival at the upcoming lights based on various potential speeds of the vehicle, with the color coding again indicating the expected states of the lights upon arrival. In yet another aspect, the intensity of the color in the bars or in the circles indicates the strength of the prediction, with relatively strong predictions corresponding to intense color and less certain predictions corresponding to more faded colors. In still a further aspect, the routing display is capable of showing how much time is remaining before upcoming traffic signals change states.

Some of the various indicators may tend to make drivers behave more safely (as indicated, for example, by increased conformance to posted speed limits) than other indicators, and this is tracked over time. To the extent one type of indicator leads to safer driving than another, the system is modified to display the indicator that tends to produce safer behavior. In one aspect, machine learning generalizes indicator preferences over time with individual users, and over new users based on learning from existing users.

The display system further includes a settings display with controls to allow a user to change certain routing and viewing preferences. In one aspect, a "heads up display" mode is selectable to allow a driver to readily see the expected state of a light. In another aspect, a "lights on map" display shows current position and status of traffic signals along an expected route. Still another aspect provides controls to select which parameters are considered by the system for determining an optimal route and expected time of arrival, including traffic light status predictions, stop signs, and turns.

In further aspects, advertising suggests alternate, sponsored destinations to drivers and provides additional related information as well.

One skilled in the art will readily recognize from the following discussion that alternative embodiments of the structures and methods illustrated herein may be employed without departing from the principles described herein.

DETAILED DESCRIPTION OF THE EMBODIMENTS

Embodiments described herein provide display systems, methods, and computer-readable storage media that use location-based technologies such as GPS or cellular signals to provide improved traffic routing. Embodiments include one-way or two-way communication between traffic signals and drivers, and between traffic signals and drivers and a traffic database. Drivers are equipped with user devices that report their location to a controller for at least one traffic signal and optionally also report the driver's destination. The traffic signals are controlled by the controller to advantageously cycle through green and red lights according to a desired impact on traffic conditions for vehicles moving through the controlled intersection. In one implementation, the controller also sends information to the user devices to suggest the fastest route to the driver's destination, the time until traffic signals turn green or red, a suggested speed or speeds to travel to arrive at one or more controlled intersections when the light is green, and/or a variety of other directions to improve traffic routing. In embodiments where traffic signals are not controlled by the controller, a routing system generates traffic signal mappings that describe characteristics of traffic signals based on data captured from a live feed of one or more public webcams.

Figure 1:
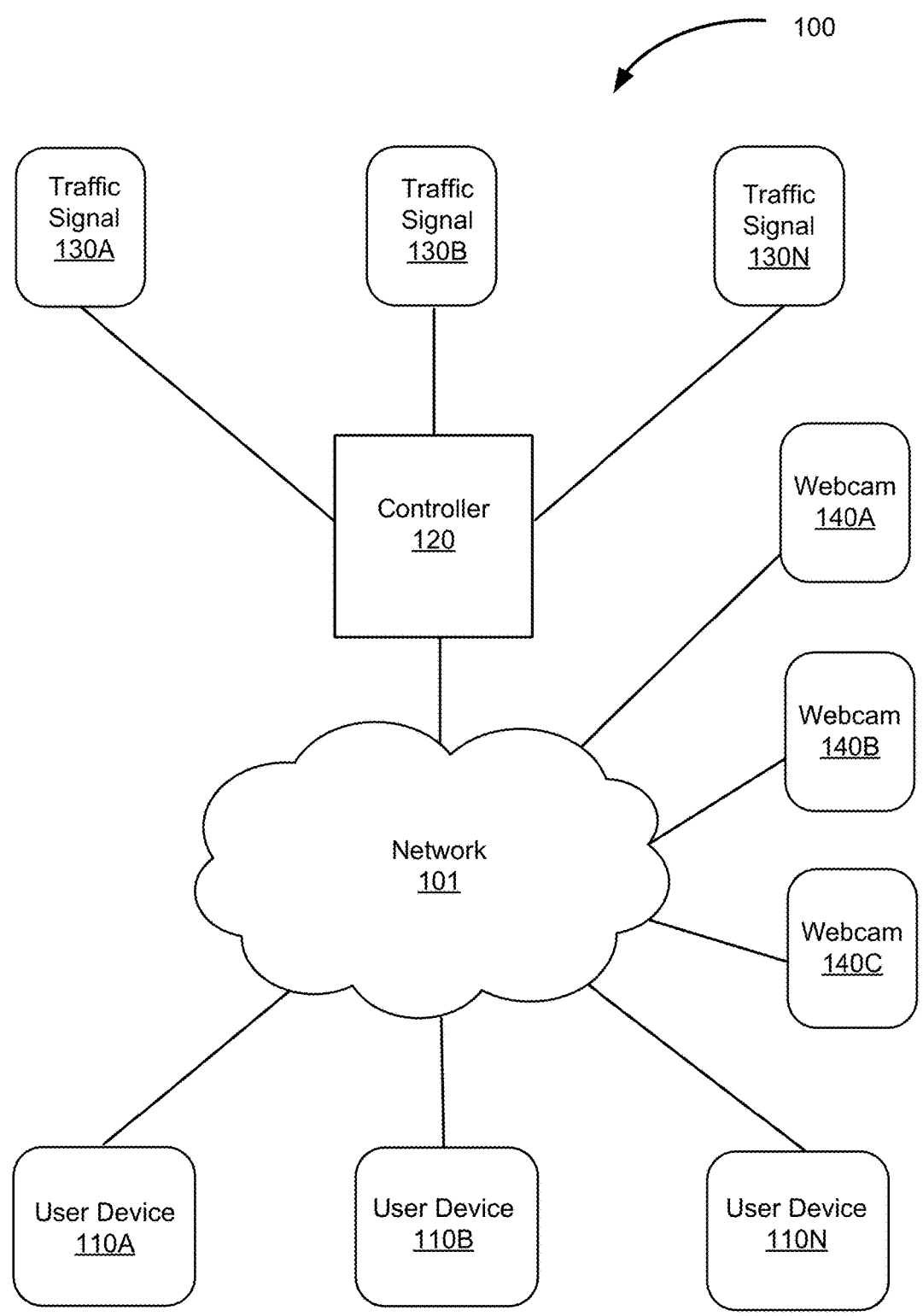
FIG. 1 is a high-level block diagram of the computing environment in accordance with an embodiment described herein.

FIG. 1 is an illustration of a system 100 in accordance with one embodiment of a routing system. The system 100 includes a plurality of user devices 110A-N that are coupled to a network 101. In various embodiments, user devices 110 may include a computer terminal, a personal digital assistant (PDA), a wireless telephone, an on-vehicle computer, or various other user devices capable of connecting to the network 101. In various embodiments, the communications network 101 is a local area network (LAN), a wide area network (WAN), a wireless network, an intranet, or the Internet, for example. In one specific embodiment, user device 110 is an iPhone® device provided by Apple, Inc. and programmed with a user-downloadable application providing one or more of the functions described herein.

The system 100 also includes a plurality of traffic signals 130A-N that are connected to at least one controller 120. The at least one controller 120 is in turn connected to the network 101. In the illustrated embodiment, all communication between the controller 120, user devices 110A-N, and traffic signals 130A-N occurs via the network 101. In one embodiment, the traffic signals 130A-N are all the traffic signals for all the controlled intersections in a local area. In one implementation, the controller 120 controls the operation of all the traffic signals 130A-N in the system. Alternatively, one controller 120 may control a subset of all the traffic signals 130A-N, and other controllers may control a portion or all of the remaining traffic signals. In still another embodiment, system 100 does not control any traffic signals but monitors the traffic signals to generate mappings that describe characteristics of the traffic signals at different times of day and different days of the week.

Figure 15:
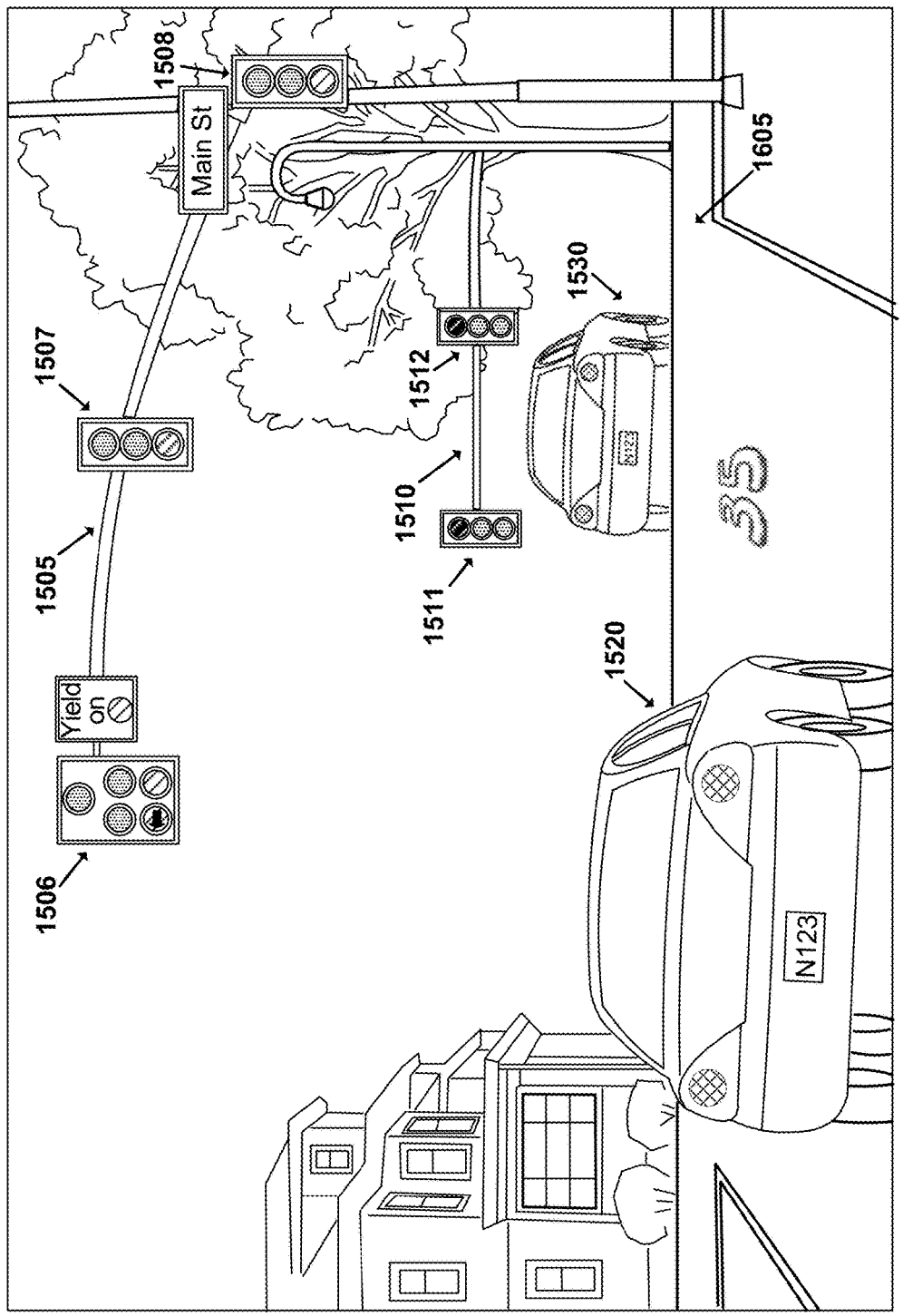
FIG. 15 is an exemplary image captured by a public webcam for use in generating a traffic signal mapping, in accordance with an embodiment described herein.

The system 100 also includes a plurality of public webcams 140A-N that are connected to the controller 120 through the network 101. In one embodiment, the webcams 140A-N are mounted on traffic light structures at an intersection and capture and display the surroundings of the structure, including vehicles, buildings, pedestrians, and other traffic signals. Additionally or alternatively, the webcams 140A-N may be located in places other than at a traffic light structure, such as mounted on a building or other structure to capture and display locations of interest to a user (such as Times Square or Wall Street), as shown in FIG. 15. Examples of such public webcams include those provided by the New York City Department of Transportation, accessible at http://dotsignals.org and by the California Department of Transportation, accessible at http://www.dot.ca.gov/d4/realtime.htm.

In some embodiments, a user (a member of the public or a municipal employee) watching the live feed through the user device 110 may change the content captured and displayed by a webcam 140 by providing input through the user interface 112 of the user device 110. For example, the user might instruct the webcam 140 to zoom the feed and/or to change the perspective of the webcam 140 (e.g., by rotating it 45 degrees to the left or 10 degrees down). In other embodiments, the position of the webcam 140 is fixed such that the user is not permitted to provide input to change the captured content.

In one implementation, the webcam 140 captures the current state of the traffic signal on the structure to which the webcam 140 is mounted and/or the state of adjacent traffic signals at the same intersection. In instances where the webcams 140A-N are not mounted on traffic light structures, captured content might still include the state of a traffic signal that is within view of the webcam 140. Furthermore, even if no traffic signals are in the field of view of a webcam, the movement of vehicles (either vertically within the frame or horizontally within the frame) provides a cue as to the status of corresponding traffic signals.

Figure 2:
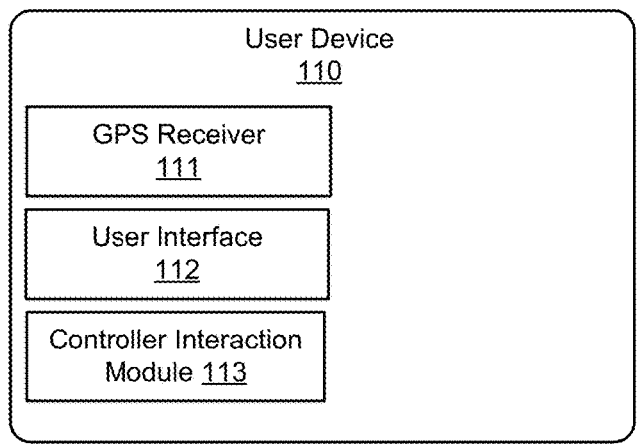
FIG. 2 is a block diagram of a user device, in accordance with an embodiment described herein.

FIG. 2 is a block diagram of a user device 110, in accordance with one embodiment. The user device 110 is in the vehicle with the driver when in operation in the system 100. The user device 110 includes a GPS receiver 111, a user interface 112, and a controller interaction module 113.

The GPS receiver 111 of the user device 110 functions to identify a precise location of the user device 110 from GPS satellite system signals received at the user device 110. Suitable GPS receivers are commonly found in handheld computing devices such as cell phones, on-board navigation systems, and other electronics. The GPS receiver 111 determines the location of the user device 110 for communication to the controller 120. Alternatively, cellular signals or other known location-determining technologies may be used to determine the position of the user device 110. For clarity, the location is discussed herein as having been determined from GPS signals although GPS signals, cellular signals or other technologies can be used in alternate embodiments.

The user interface 112 of the user device 110, discussed in greater detail below with respect to FIGS. 7-9, allows the user to input information into the user device 110 and displays information to the user. For example, the user may input a desired destination into the user interface 112 of the user device 110. The user interface 112 may display directions or a route to travel to arrive at the desired destination. The user interface 112 may also display other information relevant to the driver derived from the GPS signals received by the GPS receiver 111, received from the controller 120, or from other sources, such as current rate of speed, upcoming traffic signals, the light status of such traffic signals, rate of speed required to avoid stopping at red lights, and the like. In some embodiments, the user interface 112 also allows a user to input traffic signal status information indicating a change in the state of a traffic signal (e.g., from red to green, from red to a green left arrow, etc.) and, optionally, the cause of the change (e.g., normal traffic flow, emergency vehicle, pedestrian signal, etc.).

The controller interaction module 113 of the user device 110 manages the communication between the user device 110 and the controller 120 via network 101. Specifically, the controller interaction module 113 sends the location information determined by the GPS receiver 111 to the controller 120 and receives the controller's messages to the user device 110 regarding traffic, navigation routes, speed, traffic signals, and the like. In embodiments where the user inputs traffic signal status information through the user interface 112, the controller interaction module 113 sends the information to the controller 120 for use in generating a mapping for the traffic signal.

Figure 3:
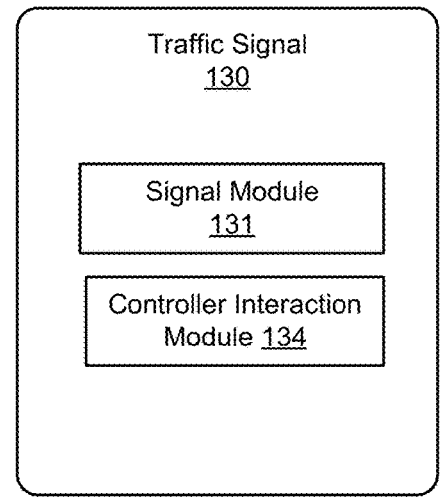
FIG. 3 is a block diagram of a traffic signal, in accordance with an embodiment described herein.

FIG. 3 is a block diagram of a traffic signal 130, in accordance with an embodiment of a routing system. The traffic signal 130 includes a signal module 131 and a controller interaction module 134.

The signal module 131 processes instructions to turn the traffic signal lights off and on and processes instructions regarding the timing of the light cycles (e.g., from green to red back to green, or in other cases from green to yellow to red and back to green). The signal module 131 may be programmed with a set of default rules for timing of the light cycles based on time of day, day of week, etc. In one embodiment, these default rules are subject to be changed based on instructions received from the controller 120. In other embodiments, the controller 120 instructs the signal module 131 of the traffic signal 130 with respect to every change in status of the light. In yet another embodiment, the controller 120 does not influence the operation of the traffic signal.

The controller interaction module 134 of the traffic signal 130 manages the communication between the controller 120 and the traffic signal 130. Specifically, in one embodiment, the controller interaction module 134 receives the instructions from the controller 120 and passes them to the signal module 131 for controlling the status of the light. (In another embodiment, the controller 120 does not send instructions for controlling the status of the light.) In some embodiments, the controller interaction module 134 sends a report to the controller 120 on the updated status of the lights of the traffic signal 130. In further embodiments, the controller interaction module 134 sends a report to the controller 120 regarding the length of time between updates of the status of the lights of the traffic signal 130.

Figure 4:
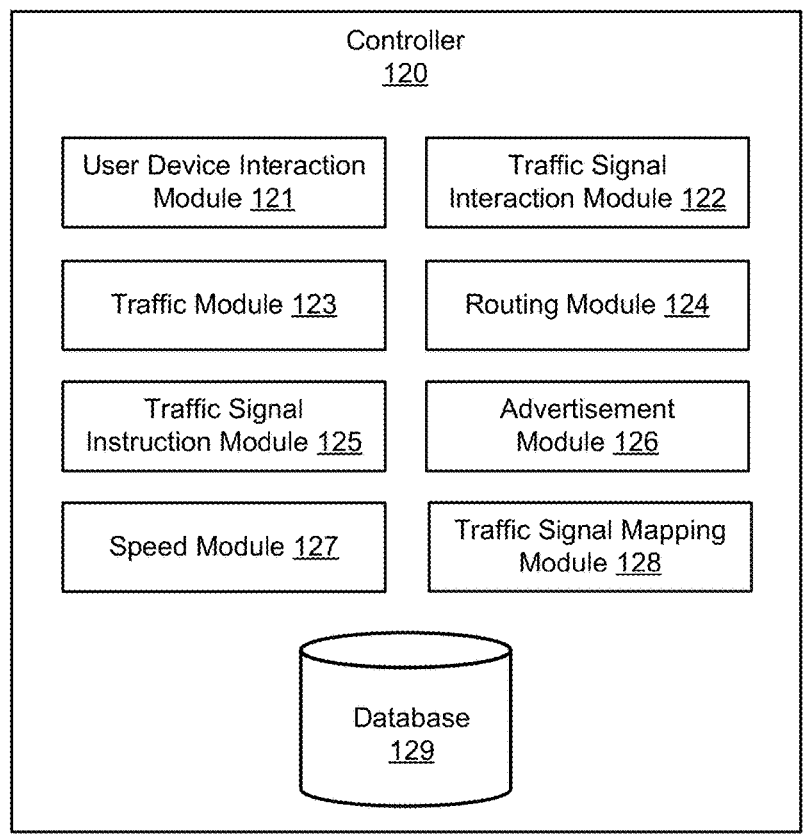
FIG. 4 is a block diagram of a controller, in accordance with an embodiment described herein.

FIG. 4 is a block diagram of a controller 120, in accordance with an embodiment of the routing system. The controller includes a user device interaction module 121, a traffic signal interaction module 122, a traffic module 123, a routing module 124, a traffic signal instruction module 125, an advertisement module 126, a speed module 127, a traffic signal mapping module 128 and a database 129.

The user device interaction module 121 of the controller 120 manages the communication with the user device 110 from the controller's side. The user device interaction module 121 receives location information and optionally destination information from the controller interaction modules 113 of the user devices 110 and sends traffic, routing, speed, or traffic signal related information to the user devices 110 via the user device interaction module 121. In some embodiments, the user device interaction module 121 receives traffic signal status information from the user interface 110 and sends the information to the traffic signal mapping module 128 for use in generating a mapping of the traffic signal.

Likewise, the traffic signal interaction module 122 of the controller manages the communication with the traffic signal 130 from the controller's side. The traffic signal interaction module 122 may send instructions to the traffic signals 130 and may receive status updates regarding the status of the lights of the traffic signals 130 in various embodiments.

In certain embodiments, the traffic signal interaction module 122 monitors the status of traffic signals 130A-N through the public webcams 140A-N. For each traffic signal 130, the traffic signal interaction module 122 searches public webcam feeds to determine which of webcams 140A-N capture and display the traffic signal 130.

Public webcams require less processing capability than vehicle-mounted cameras and allow the traffic signal interaction module 122 to search images for objects that become light and dark on a regular basis and are illuminated in relevant colors (i.e., red, yellow, and green). In one embodiment, the system uses a simplified technique due to differences between successive images taken by a public webcam. In such an embodiment, the traffic signal interaction module 122 searches the feeds for pixels that are likely to relate to a traffic signal (i.e., pixels that undergo a significant change in illumination state in a periodic fashion corresponding to a traffic signal, for instance in a typical municipality approximately once every 100 seconds).

The traffic signal interaction module 122 filters an image from the public webcam feed to identify background areas or other unwanted features from the image. In such an embodiment, the image depicts a traffic signal in context with its surroundings. Even if the image is closely cropped around the bounds of the traffic signal, additional unwanted or extraneous features (such as traffic signal structures, roads, vehicles, etc.) may still be present. Removing these additional features can improve the ability of the traffic signal interaction module 122 to accurately detect traffic signals. The traffic signal interaction module 122 can, for example, generate a mask for the portion of the image that contains the pixels likely to relate to a traffic signal and overlay on the mask a rectangle in the approximate shape of a traffic signal (i.e., typically a roughly 1:3.5 ratio). For each rectangle, the traffic signal interaction module 122 interprets pixel illumination as if the rectangle were a traffic signal. In embodiments where the traffic signal is mounted vertically, high illumination in the upper third of the rectangle is red, in the middle third is yellow, and in the bottom third is green. Similar techniques may be performed in instances where the traffic signal is mounted horizontally. The traffic signal interaction module 122 then calculates a score for each rectangle based on the pixel illumination. Responsive to the scores exceeding a score threshold, the traffic signal interaction module 122 determines that the rectangle is a traffic signal and selects the traffic signal for monitoring. In embodiments in which low-resolution images are available, mere reference to adjoining light-dark transitions is found to suffice to identify traffic signals and the state thereof.

In other embodiments addressing slightly different applications, it may be desirable to use machine learning techniques to identify traffic signals in public webcam feeds and, optionally, other feeds such as vehicle-mounted cameras. In one such embodiment, the traffic signal interaction module 122 applies machine learning techniques to generate a computer model that when applied to a public webcam feed outputs an indication of whether the feed contains one or more traffic signals. As part of the generation of the computer model, the traffic signal interaction module 122 forms training data by identifying a positive training set of webcam images or videos that have been determined to contain one or more traffic signals and a negative training set of webcam images or videos that have been determined not to contain a traffic signal. In some embodiments, the training data includes identification of other structures captured by the training set of webcam images or videos, such as adjacent buildings, bus shelters, lampposts, and the like.

The traffic signal interaction module 122 extracts feature vectors from the webcam data of the training set, the feature vectors being variables deemed potentially relevant to whether a public webcam feed contains one or more traffic signals. Specifically, the feature vectors extracted by the traffic signal interaction module 122 include color, texture, motion rigidity, or audio from video content.

The traffic signal interaction module 122 uses supervised machine learning to train the computer model, with the feature vectors of the positive and negative training sets serving as inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—are used in different embodiments. The computer, when applied to the feature vector extracted from a webcam feed, outputs an indication of whether the feed contains one or more traffic signals.

Responsive to the computer model determining that the public webcam feed contains, or otherwise indicates the state of, one or more traffic signals (such as via a Boolean yes/no estimate or a scalar value representing a probability exceeding a threshold value), the traffic signal interaction module 122 selects the webcam 140 for monitoring. If the webcam is not currently pointed in a direction useful to the task, the feed is, for the present, ignored and is set to be checked later to see whether it may be pointed in a usable direction.

The traffic signal interaction module 122 monitors the current state of the traffic signal using the live feed captured by the webcam 140 and sends traffic signal information indicating the status (and in some embodiments, timing) of the traffic signal to the traffic signal mapping module 128. In some embodiments, the traffic signal interaction module 122 sends a notification to the traffic signal mapping module 128 in real time responsive to the status of the traffic signal changing (e.g., indicating that traffic signal 130A changed from red to a left green arrow at 10:02:18 AM). Alternatively, the traffic signal interaction module 122 might batch traffic signal status information and send the information to the traffic signal mapping module 128 periodically (e.g., every three minutes). For example, the batched information might indicate that traffic signal 130A changed from red to a green left arrow at 10:02:18 AM, from a green left arrow to a green light at 10:02:28 AM, from a green light to a yellow light at 10:03:08 AM, and from a yellow light to a red light at 10:03:15 AM.

In some embodiments, the traffic signal interaction module 122 weeds out false positive traffic signal information before sending the information to the traffic signal mapping module 128. For instance, green is a color that in video is often very similar to the color of the background sky, amber is a color used in many vehicular parking/signal lights, and red is a color used in vehicular brake lights as well as in, for example, a pedestrian signal. Particularly when traffic signals are at a distance from the webcam 140, such other features may be readily confused with a traffic signal. The traffic signal interaction module 122 identifies the traffic signal(s) in the live feed by removing artifacts such as brake lights and pedestrian signals from consideration. Using temporal and spatial techniques to identify traffic signals is described in U.S. application Ser. No. 15/473,177, filed on Mar. 29, 2017, which is hereby incorporated by reference in its entirety.

Particularly for webcams viewing intersections with constant vehicular activity, a potentially simpler embodiment is merely using optical flow algorithms to identify movement, or lack of movement, of vehicles in one direction or another. For example, a typical webcam video placed north facing along an avenue in New York City will show vertical movement of vehicles when the traffic signal is green for the avenue, and horizontal movement of vehicles when the traffic signal is red for the avenue (and green for the corresponding cross-street). This can provide a mechanism for identifying the color of a signal even if the signal itself is not visible in the webcam.

In various embodiments, the speed module 127 of the controller 120 calculates combinations of a constant speed range, multiple speed ranges, and acceleration and deceleration patterns required to pass through one or more consecutive traffic signals without coming to a stop. In one embodiment, the speed module 127 uses information gathered from the GPS receiver 111 of the user device 110 and from the signal module 131 of the traffic signal 130 to calculate the range of speed required to pass through one or more consecutive traffic signals without stopping at a red light. This calculated speed range is then displayed on the user interface 112 of the user device 110 via the user device interaction module 121. In one aspect, the speed module 127 separately calculates a fixed speed range required to pass through each individual traffic light along the selected route, and then defines the single speed range required to pass through multiple consecutive traffic signals by determining the overlap of the acceptable speed ranges for consecutive traffic signals. In another aspect, the speed module 127 calculates the speeds to maintain for a given duration of time and for a given distance. In another embodiment, the speed module 127 calculates the accelerations and decelerations to achieve over a given duration of time and for a given distance.

Note that in order to ensure the safety of users of system 100 as well as the safety of individuals in close proximity, in some embodiments system 100 includes a cap on the maximum speed requested based on the speed limit of the given street, as well a minimum speed so as not to disrupt traffic flow. Furthermore, in some embodiments traffic conditions are taken into consideration such that the system does not suggest a speed that is unattainable based on road congestion.

Figure 10:
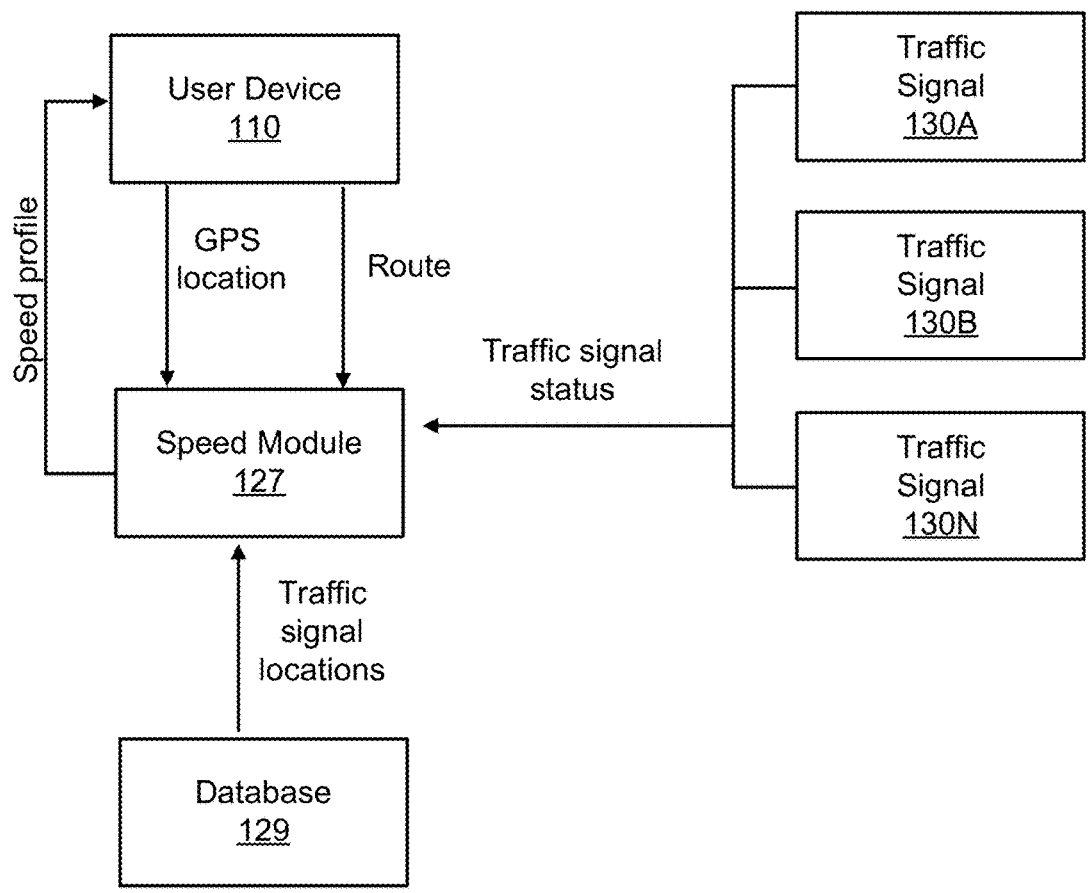
FIG. 10 is a block diagram illustrating a method for the calculation of vehicle speed instructions, in accordance with an embodiment described herein.

FIG. 10 is a block diagram that depicts the determination and delivery of speed instructions to the user device 110 by the speed module 127. The user device 110 determines its location via the GPS receiver 111. The location of the device, and optionally the user's destination and travel route, are sent to the controller 120 via the controller interaction module 113. Each traffic signal 130A-N along the given route determines the status of the light of the traffic signal via the signal module 131. If no route or destination has been specified, the route is assumed to be straight along the street that the vehicle is on at that moment. The status of each traffic signal is sent to the controller 120 via the controller interaction module 134. The user device GPS location, optionally the route and destination of the user device, and the traffic signal statuses are inputs of the speed module 127. Using these inputs as well as information regarding the locations of traffic signals from the database 130 (and, optionally, traffic signal mappings for traffic signals along the given route), the speed module 127 determines an optimal speed profile for the user device 110 such that it will stop at as few red lights as possible along the given route. The speed profile is then sent to the user device 110 via the user device interaction module 121.

The traffic module 123 receives information identifying the location and, in some embodiments the speed, of the user devices 110 from the user device interaction module 121 and stores the information in a database 129. The traffic module 123 may also store information regarding traffic conditions from other sources such as other users with user devices 110, traffic services, news reports, and the like. The traffic module 123 may also receive data regarding events likely to influence traffic such as construction projects, emergency vehicle activity, and the like. The traffic module analyzes the received traffic data to determine current and in some embodiments predicted future traffic conditions, and the traffic module 123 may report traffic conditions through the user device interaction module 121 to the user devices 110.

The routing module 124 and the speed module 127 utilize the information communicated to the controller 120 about the locations of the user devices 110 and optionally their destinations, with the traffic conditions assessed by the traffic module 123 to prepare routing and speed instructions for the user devices 110. In some embodiments the assessment includes observed traffic conditions, predictive analysis, or both. In some embodiments, the routing module 124 also considers the status and timing of the traffic signals 130 to recommend routes that result in less time for drivers spent waiting at red lights or that are otherwise advantageous.

In embodiments in which the controller 120 influences traffic signals, the traffic signal instruction module 125 combines information communicated to the controller 120 about the locations of the user devices 110 and optionally their destinations with the traffic conditions assessed by the traffic module 123 to prepare instructions regarding when to turn lights off and on and the appropriate timing for the cycle of lights. The traffic signal instruction module 125 may be programmed with a set of rules regarding constraints. For example, emergency responder vehicles may be given priority to reach their destinations without interruption by stoplights. Further constraints in additional embodiments may include a maximum limit to the time length of a light, the maximum number of cars waiting for a light to change, the relative timing or synchronization between lights, and so forth. In one embodiment yet another constraint is presence of one or more other vehicles being routed and tracked by the system 100. For example, it may be known that a tracked vehicle will trigger a light's proximity sensor and cause it to cycle, because the system 100 is routing the vehicle on a known path and is aware of the vehicle's position.

The advertisement module 126 is included in certain embodiments to present the user with advertising related to a route request. For example, if routing module 124 has determined a route that passes nearby to an advertiser, advertisement module 126 is configured to present an advertisement, such as a coupon, to the user. In one embodiment, advertisement module 126 is configured to detect a destination request from the user that is related to an advertiser, because the advertiser has specifically requested activation upon that destination request (e.g., entry of a competitor's destination) or because the advertiser has requested activation upon any destination request of a particular type (e.g., electronics store). In still another embodiment, mere proximity of a route to a sponsored location triggers an advertisement. Once it is determined that a requested destination relates to an advertiser by one of these mechanisms, advertisement module 126 generates an appropriate coupon or other advertisement for display on user device 110.

Advertisement module 126 is configured in certain embodiments to provide information about an advertiser to a user even in circumstances where the advertiser's location and the requested destination are in dissimilar directions. In some instances, the advertiser's location may be in another direction but closer or quicker in driving time than the originally requested destination. In other instances, the information about an advertiser (such as a discount coupon) may provide an incentive for a user to go to that advertiser's location even if it is not closer or quicker.

In one embodiment, if the user originally selected an advertiser's location as a destination, it may still be appropriate to provide the user with a coupon or other information about that advertiser, for instance to ensure that the user actually decides to go to that location or to encourage the user to make additional purchases from the advertiser.

In some embodiments, in addition to or instead of an advertisement, other relevant information is generated for display on user device 110. For example, should a user input a destination location corresponding to a retail store and that store will be closed at the estimated arrival time (as determined by review of the store's web site or as populated in a database of such information), a message warning the user that the store will be closed is displayed on user device 110 and the user is asked to verify whether that destination is still desired. In some embodiments, an alternate proposed destination (i.e., a store that will not be closed) is suggested to the user via display on user device 110 as well.

Due to safety concerns, in some embodiments it may be desirable to display advertisements and coupons on user device 110 only when the vehicle is not in motion. Accordingly in some embodiments the advertisement module 126 accesses motion information derived from the operating system of user device 110 to determine whether the vehicle is in motion. The advertisement module 126 then uses the given motion information to determine when to present an advertisement.

The traffic signal mapping module 128 receives traffic signal status information from the traffic signal interaction module 122 and/or from the user device 110 and aggregates the information to generate a mapping for each traffic signal 130. In some embodiments, the traffic signal mapping module 128 relies on user input indicating a change in the traffic signal status (e.g., in instances where the traffic signal is not within view of any of the webcams 140A-N and/or the confidence score of the webcams 140A-N does not exceed the confidence score threshold). For example, traffic signal status information might be generated by individuals hired to monitor the status of one or more traffic signals for a specified period of time. In such an embodiment, user input might include an indication that the status of the traffic signal has changed, the type of change that occurred (e.g., from green to yellow), the time that the change occurred, and optionally, the reason for the change.

Alternatively, in certain embodiments, the traffic signal mapping module 128 relies solely on traffic signal information gathered by monitoring the public webcams 140 (e.g., in instances where the traffic signal status is clearly captured by the webcam 140 at all times of day such that user input is not necessary to generate the mapping). In still other embodiments, the traffic signal mapping module 128 uses both user input and traffic signal status information reported by the traffic signal interaction module 122 to generate the mapping.

In still further embodiments, traffic signal status information for one or more intersections is used to generate and/or supplement mappings for other traffic signals (e.g., signals that are not within view of any of the webcams 140A-N). For example, assume that the traffic signal mapping module 128 receives traffic signal status information from a webcam and/or via user input for three traffic signals on $7^{th}$ Avenue in New York City, a one-way street. The traffic signals are located at $42^{nd}$ Street, $16^{th}$ Street, and $15^{th}$ Street. Based on traffic signal status information for adjacent $16^{th}$ and $15^{th}$ Streets, the traffic signal mapping module 128 determines that the traffic signals are timed to support traffic moving at a speed of 25 mph, which is confirmed by the traffic signal status information for the traffic signal at $42^{nd}$ Street. Responsive to the traffic signal mapping module 128 determining that the target speed for the three traffic signals is 25 mph, the traffic signal mapping module 128 generates (or, in some embodiments, supplements) mappings for other traffic signals on $7^{th}$ Avenue (e.g., traffic signals between $16^{th}$ and $42^{nd}$ Street and traffic signals above $42^{nd}$ Street).

A mapping for a traffic signal includes data regarding the status of the traffic signal at different times of day and days of the week as well as timing information indicating the length of time that the traffic signal remains in various states. In various implementations, the mapping also includes an indication of how often the traffic signal status is affected by factors other than routine traffic flow, for example, by emergency vehicles or pedestrian signals.

Once generated, the traffic signal mapping is sent to the database 129 for storage and can be used by the routing module 124 to prepare routing and speed instructions for user devices 110. For example, the routing module 124 might retrieve traffic signal mappings for traffic signals along various routes from a user device GPS location to a destination location and use the mappings to determine the recommended route (e.g., the route that will result in the driver spending the least amount of time stopped at red lights). For example, the mappings for traffic signals 130A-C (located consecutively along a street) might indicate that the signals are typically green from 8:04-8:05 AM on weekdays. If the routing module 124 determines that the street is on a candidate route to the driver's destination and the user device GPS location is such that the driver's vehicle is likely to traverse at least traffic signal 130A between 8:04-8:05 AM, the routing module 124 might select the candidate route as the recommended route for the driver.

A single database 129 is shown in FIG. 4 as internal to the controller 120, however in other embodiments, the database 129 may comprise a plurality of data stores, some or all of which may reside remotely from the controller 120. For example, the data stores may be elsewhere on the network 101 as long as they are in communication with the controller 120. The database 129 is used to store user device locations, traffic conditions, alternative navigation routes and maps, traffic signal information including locations and traffic signal instructions, and any other data used by the controller for purposes such as analysis or communication with user devices 110 or the traffic signals 130.

Figure 5:
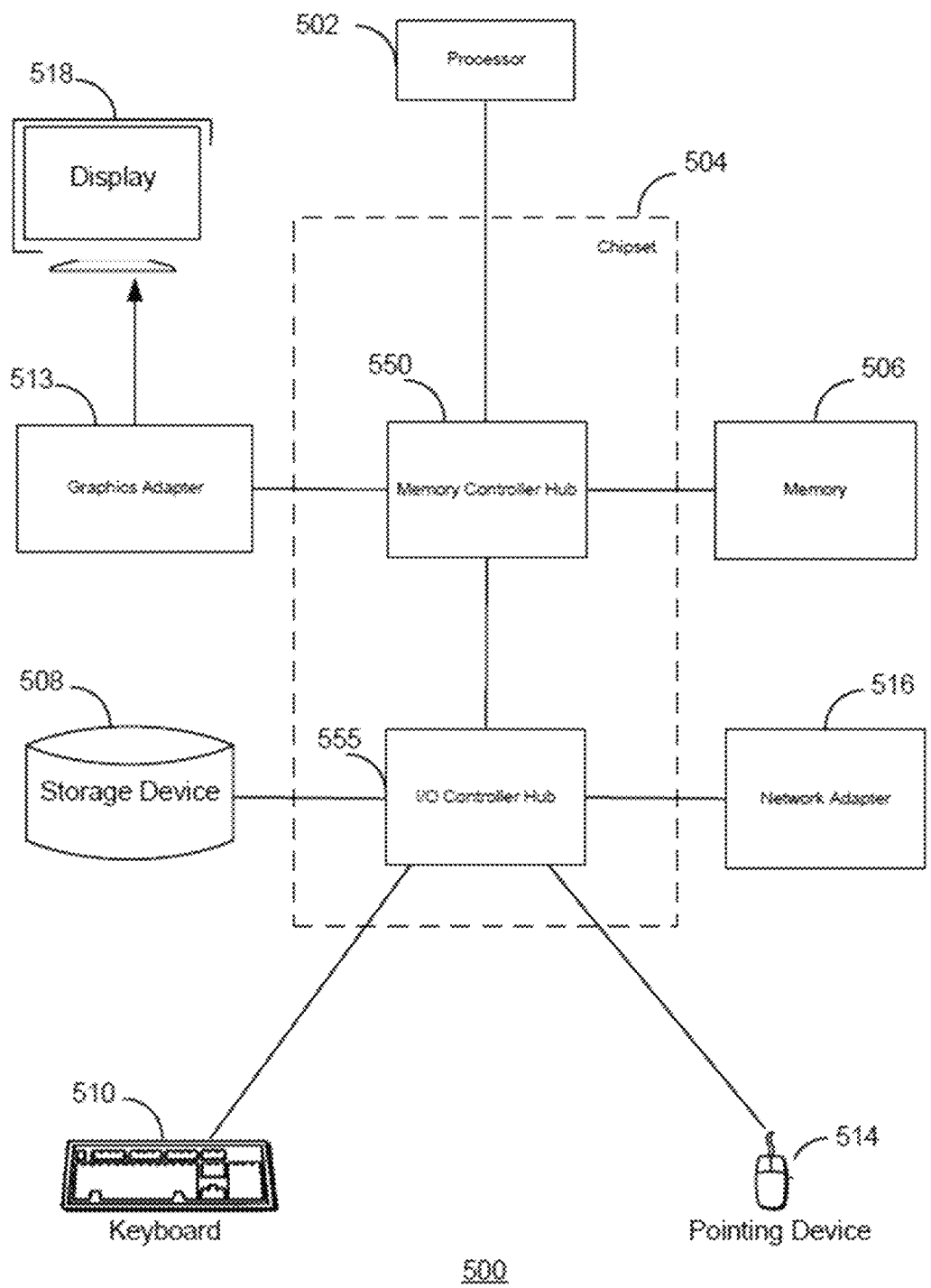
FIG. 5 is a block diagram illustrating an example of a computer for use as a user device, a traffic signal, or a controller, in accordance with an embodiment described herein.

FIG. 5 is high-level block diagram illustrating an example of a computer 500 for use as a user device 110, a controller 120 or a traffic signal 130, in accordance with an embodiment of the routing system. Illustrated are at least one processor 502 coupled to a chipset 504. The chipset 504 includes a memory controller hub 550 and an input/output (I/O) controller hub 555. A memory 506 and a graphics adapter 513 are coupled to the memory controller hub 550, and a display device 518 is coupled to the graphics adapter 513. A storage device 508, keyboard 510, pointing device 514, and network adapter 516 are coupled to the I/O controller hub 555. Other embodiments of the computer 500 have different architectures. For example, the memory 506 is directly coupled to the processor 502 in some embodiments.

The storage device 508 is a computer-readable storage medium such as a hard drive, compact disk read-only memory (CD-ROM), DVD, or a solid-state memory device. The memory 506 holds instructions and data used by the processor 502. The pointing device 514 is a mouse, track ball, or other type of pointing device, and in some embodiments is used in combination with the keyboard 510 to input data into the computer system 500. The graphics adapter 513 displays images and other information on the display device 518. In some embodiments, the display device 518 includes a touch screen capability for receiving user input and selections. The network adapter 516 couples the computer system 500 to the network 101. Some embodiments of the computer 500 have different and/or other components than those shown in FIG. 5.

The computer 500 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The types of computers 500 used by the entities of FIG. 1 can vary depending upon the embodiment and the processing power used by the entity. For example, a user device 110 that is a PDA typically has limited processing power, a small display 518, and might lack a pointing device 514. The controller 120, in contrast, may comprise multiple blade servers working together to provide the functionality described herein.

Figure 6:
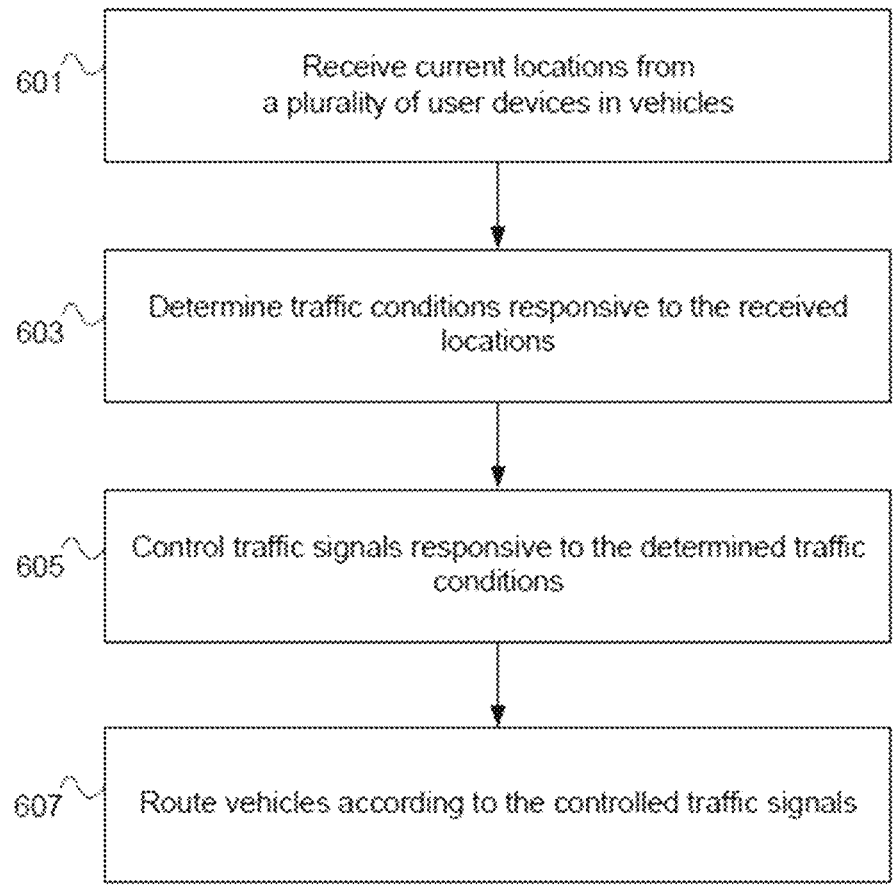
FIG. 6 is a flow chart illustrating a method of providing improved traffic routing, in accordance with an embodiment described herein.

FIG. 6 is a flow chart illustrating a method of providing improved traffic routing. In step 601, the current locations (and in some embodiments, speeds) are received from a plurality of user devices 110 in vehicles. The current locations may be ascertained using GPS or other signals by the user devices 110 and communicated to the controller 120 via the network 101, for example. In some embodiments, the destinations of the users are also communicated from the user devices 110 to the controller 120.

In step 603, the traffic conditions are determined responsive to the received locations of the user devices 110. In some cases, the traffic conditions are also determined responsive to other sources of traffic information such as traffic websites, traffic services, etc. In one embodiment, roadwork and emergency vehicle activity are also considered in determining the traffic conditions. In one embodiment, system 100 provides predictive modeling of anticipated traffic speeds based on the various sources of information provided to system 100.

In step 605, optionally, traffic signals are controlled responsive to the determined traffic conditions. For example, instructions are sent from controller 120 to individual traffic signals 130 to turn them on or off or adjust the timing of the light cycles to ease congestion identified in the traffic conditions.

In step 607, vehicles are routed according to the controlled traffic signals and other traffic information. For example, the controller 120 may send route information or speed information to the user devices 110 to enable the drivers of the vehicles in which the user devices 110 reside to avoid red lights and/or avoid congested areas if the instructions from the controller 120 with respect to the route information or speed information are obeyed.

Embodiments that provide systems, methods, and computer-readable storage media that use location-based technologies such as GPS to provide improved traffic routing have been described above. Benefits of such embodiments include:

1. Better synchronization of drivers and traffic signals. As a result, people can spend less time waiting at traffic signals. Additionally, better synchronization results in drivers being able to maintain a more constant speed and avoid abrupt accelerations and decelerations caused by stopping at traffic signals. Reduced acceleration/deceleration while driving results in increased miles per gallon of gas for cars and reduced carbon emissions. The better synchronization of drivers and traffic signals results in tangible benefits to everyone, including drivers who do not use the user devices 110, because embodiments as described herein avoid gridlock and generally improve the flow of traffic. Thus, helping a relative handful of drivers who use the user devices 110 to proceed smoothly will also help alleviate the burdens of traffic to the rest of the drivers.
2. Improved ability to clear roads for emergency responders. Not only can traffic signals be informed of an emergency response vehicle approaching in order to block cross traffic to avoid an accident, but also can turn appropriate lights green to relieve congestion in the path of an emergency response vehicle. Non-emergency traffic, meanwhile, is routed elsewhere so that by the time an emergency vehicle arrives at an intersection, there are fewer other vehicles in contention with it.
3. Improved ability to support mass transit. The traffic signals can be preferentially managed to support buses, trolleys, and trains to avoid having these mass transit vehicles wait for traffic signals. In addition, cars can be managed to avoid having to wait for trains or other mass transit vehicles.
4. Load balancing during busy periods. The traffic signals and other signals to drivers can be managed so as to balance the traffic between a number of known traffic bottlenecks or popular routes (such as multiple bridges across a single river, and main thoroughfares into or out of an urban area).
5. Synchronization of drivers with each other. In one particular embodiment, drivers are directed among a plurality of routes according to characteristics of the vehicle, the driver, or the desired destination. For example, all trucks are directed to one thoroughfare and all cars are directed to another. This helps avoid the inconveniences to car and truck drivers of travelling on the same route. Namely, trucks reduce the visibility that smaller cars have of the road and trucks' longer acceleration times can frustrate car drivers. The shorter braking distance of cars compared to trucks increases the risk of collisions when both are travelling the same route. Also, truck drivers prefer to travel near other trucks to save on fuel by drafting off of each other. As another example, everyone on route A plans to exit in no less than 5 miles, whereas everyone on route B plans to exit in less than 5 miles. This may improve traffic flow through congested areas.
6. Prediction and avoidance of congestion. Drivers can be routed around congested areas, thus easing congestion. This results in less driving time and lower carbon emissions.
7. Improved traffic monitoring. The results of accurate traffic monitoring can be used in many applications, such as to plan new roads and improvements to infrastructure, or to coordinate the timing of construction projects on infrastructure to lessen the impact on drivers.
8. Accurate real-time traffic information, including on city streets. Accurate traffic information is useful for trip planning and commuting. The real-time traffic conditions could be used as inputs into various other scheduling systems to ensure timely arrivals for meetings, events, etc. For example, based on the traffic conditions for any given day, an alarm clock may be programmed to wake a person up 30 minutes before he needs to leave for work in order to arrive on time.

The discussion above addresses a system in which there is two-way communication among vehicles and traffic systems. In other embodiments, even simpler one-way communications are used. Specifically, a location-aware user device 110 such as a smart phone in a vehicle sends a message to traffic signal 130 indicating that the vehicle is approaching the traffic signal 130 from a particular direction and may also transmit the vehicle's destination. If appropriate, traffic system 130 changes its operation so as to allow the vehicle to pass with minimal slowdown. As a specific example, consider a smart phone such as the iPhone® device provided by Apple, Inc. and mentioned above. Such device is location-aware and is readily programmed by software applications to perform a variety of functions. In one specific embodiment, a software application directs the device to periodically send its location and optionally the vehicle's destination to a specified site via the Internet, for example controller 120. Depending on the vehicle's location and heading, controller 120 then sends traffic signal 130 a signal indicating that traffic is approaching from a particular direction. If appropriate (for instance during late-night hours with little expected traffic), traffic signal 130 then changes the state of its lights so as to allow the vehicle to pass without having to stop.

Such one-way communications can also be used effectively in environments having multiple vehicles with user devices 110. For example, controller 120 can compare the number of eastbound/westbound vehicles at a particular intersection with the number of northbound/southbound vehicles and cause traffic signal 130 to adjust its light cycles accordingly.

One-way communications in the other direction (i.e., from the traffic signal to vehicles) may also be effective. For instance, a software application on user device 110 may obtain from the traffic signal 130, via controller 120, an indication that a light has just turned red and will not turn green again for one minute. If the intersection is not visible to the driver, for instance because the approach is hilly or on a curve, this information can be used to tell the driver that there is no point in approaching the intersection quickly, since the vehicle will only need to wait for the green light anyway. Thus, safety can be enhanced near "blind" or otherwise dangerous intersections. In addition, knowledge of the cycle of a traffic signal from a distance can help drivers time their approaches to controlled intersections to coincide with a green light. Thus, drivers can reduce the time they spend waiting at red lights.

In one specific embodiment, users are provided incentives to keep their devices in active operation while en route, rather than just at the outset of a journey. This is advantageous to all users of the system because the more users who are "live" on the system (e.g., have the appropriate application operating on their user devices 110), the more information can be collected from such users regarding traffic information at various locations. Using the example of an iPhone, for instance, if an "app" implementing the system is kept on during transit, not only will the user obtain updated information, but the system will obtain ongoing information from that user, such as traffic speed at the user's location.

In order to provide such incentive, a user interface of the application running on user devices 110 provides updated information during travel. In one particular embodiment discussed in greater detail in connection with FIGS. 7-9, the predicted state of a light that the user is approaching is presented to the user differently depending on the certainty of the prediction. For example, a visual display of the light's predicted state can start out, when the prediction is relatively uncertain, as a rather faded color, and increase in intensity as the certainty grows. As another example, a change in a light's predicted state can be announced to the user by audio as well as visual messaging, and the proposed route or speed can likewise be altered on the fly if an originally preferred route now appears suboptimal due to changes in the predicted state of one or more lights.

In some embodiments, multiple types of displays are presented to users indicating information regarding a light's predicted state, such as minimum speed to reach the intersection while the light is still green, maximum speed to reach the intersection above which increased speed would only result in waiting for the light to turn green, colored indicators showing predicted state of the light that do not suggest a speed but are based on not exceeding the speed limit, and simple "SPEED UP" or "SLOW DOWN" messages for a current route. In these embodiments, data regarding a user's actual speed is collected from user devices 110 over time and used to determine which information display leads to the safest behavior (greatest conformance to speed limit least running of red lights, etc.). In one embodiment, this is done by a machine learning module (not shown) implemented, for example, by controller 120. If it is found that one type of indicator results in safer driving then that display is used. Over time, it may be that for one driver a first type of display results in safer driving while for another driver a second type of display results in safer driving. In such case, the display is individualized for each driver accordingly.

In one example, some drivers may find it confusing to have multiple suggested speeds displayed (e.g., one currently suggested speed and an indicator that after a light is passed, a slightly different speed should be used), so in those cases system 100 merely provides a single speed (or range of speeds) that will, for example, allow the driver to arrive at the next two traffic signals while they are green.

Various alternate embodiments permit a range of such processing to be employed. In one alternate embodiment, machine learning for system 100 is implemented by providing different drivers with different types of displays, and then determining after a period of time which of the displays results in the safest driving averaged over all users. In another embodiment, different displays are presented to a driver at different times, and the safest design for each driver eventually becomes the one that is presented most often or, in some embodiments, the only one that is displayed. To accomplish the machine learning, system 100 is configured in one environment to sometimes provide only a first display to a user device 110 and other times only provide a second display to the user device 110. In another embodiment using a more subtle approach, user device 110 is instructed to provide a first display initially followed by a second display, such as a green dot followed by a proposed speed. Using data uploaded from user device 110, inferences are made as to whether a driver began to exceed the speed limit only after the second display appeared. The order in which the displays are updated is in some embodiments switched while in a learning phase to allow for more complete testing of which displays lead to safer driving.

In some embodiments, traffic data collected from user devices 110 over a period of time is stored in database 129 and processed further by controller 120 to determine or refine routes proposed by routing module 126. In one specific embodiment, vehicle speed information collected over a period of time is used to determine the presence of stop signs that were not previously known by the system. Knowledge of where such stop signs are located allows the system to build in appropriate delays when considering routes that include intersections with those stop signs. Similarly, over a long period of time it may be evident that no user devices 110 have traversed a given portion of a mapped road. Such data may indicate that the road was planned but never built, that the road has been closed, or that the road is unavailable for use for some other reason. Based on such collected data, in some routing module 126 ignores such road segments as being available for a proposed route. Conversely, location and speed data from user devices 110 may indicate that a new road has been built that is not on the base map loaded into database 129, and if there is enough vehicular use of such a route, then routing module 126 assumes such a path, even though not mapped, is available for a proposed route.

Still more detailed collected and real-time information from user devices 110 is used by system 120 in certain embodiments. Real-time average vehicle speed from other vehicles, historical average vehicle speed, vehicle speed variance over time, deviation of a given user's vehicle speed compared to other vehicles' speeds over the same route (indicating an aggressive or conservative driving manner) and best/worst case speed data are all used as inputs by system 120 to predict the time it will take a vehicle corresponding to a particular user device 110 to traverse a specific segment of a possible path.

As one example, by collecting data system 100 may determine that a particular segment of road is subject to 25 mph speed limits during certain times and 40 mph speed limits during other times, for instance indicating a school zone with a reduced speed limit sign that flashes to invoke the lower limit during times when children are present. Further, system 100 determines that some users tend to be conservative and drive according to the 25 mph sign regardless of whether the lights are flashing, while others reduce speed only when the lights are flashing. For users who reduce speed all of the time, system 100 routes them based on a lower expected speed regardless of the actual speed limit; other users get routed based on an expectation that they will match the actual speed limit in effect at the time. Changes in speed limit also occur on some roadways based on time of day, vehicle type (truck or automobile), construction activity and the like. In some embodiments system 100 detects patterns in collected data indicating such changes and accounts for them in determining routes and estimating transit times.

In certain embodiments, system 100 adaptively segments routes into smaller pieces over time when collected data suggest such smaller segmentation will yield more accurate estimates of travel time. For example, system 100 may start out by considering the entirety of a street as one segment, but data collected over time may indicate that there is a school zone impacting a certain portion of the road. In response, system 100 divides the road into three segments, so that those who exit the road well before the school zone are not considered subject to the reduced speed limit that would affect a driver going past the school.

Further extending this example, school bus routes often slow traffic considerably, but only for a small portion of each day. By collecting information from user devices 110 over a period of time, system 100 may infer that during school days, certain routes that otherwise have a much higher average speed will be congested at specific known times. During those times, preference is given to routes that avoid approaching or following a school bus. Not only does such routing improve transit times, but it also increases safety by reducing the number of conflict points between vehicles and children getting on or off a bus.

Other factors that can be considered for such correlations include rush hour, weekday/weekend differences in travel, large sporting events or conventions, holiday shopping times, freight or commuter train crossings, ferries, radar speed enforcement and the like. A particular advantage of using data collected from user devices 110 for this purpose is that temporal changes in estimated segment transit times and correlations do not need to be calculated for all road segments, but only those showing significant time-dependent variations. Processing requirements for system 100 are thus dramatically reduced compared with a system configured to make temporal predictions for all road segments.

In some instances, external data sources are used instead of, or in addition to, the collected data referenced above. For example, in one embodiment significant periodic changes in observed traffic at a particular location trigger system 100 to search external data sources (such as through a location-based internet search) to determine a cause of such changes, such as presence of a school, railroad crossing or sports venue; notice of a period of road construction; or public warning that a road is only seasonal and is not maintained in winter. In such embodiments, system 100 is programmed to then search for information that correlates with the observed data and can be used to make predictions for transit time in the future. In an exemplary embodiment, should system 100 determine, by a location-based search, that a school is located where there are large variations in transit time, system 100 then searches the Internet for a school calendar and extracts information as to what days the school is open so that the system can predict when traffic is likely to be slowed down in the vicinity of the school.

Figure 7:
FIG. 7 is a destination display in accordance with an embodiment described herein.
Figure 8:
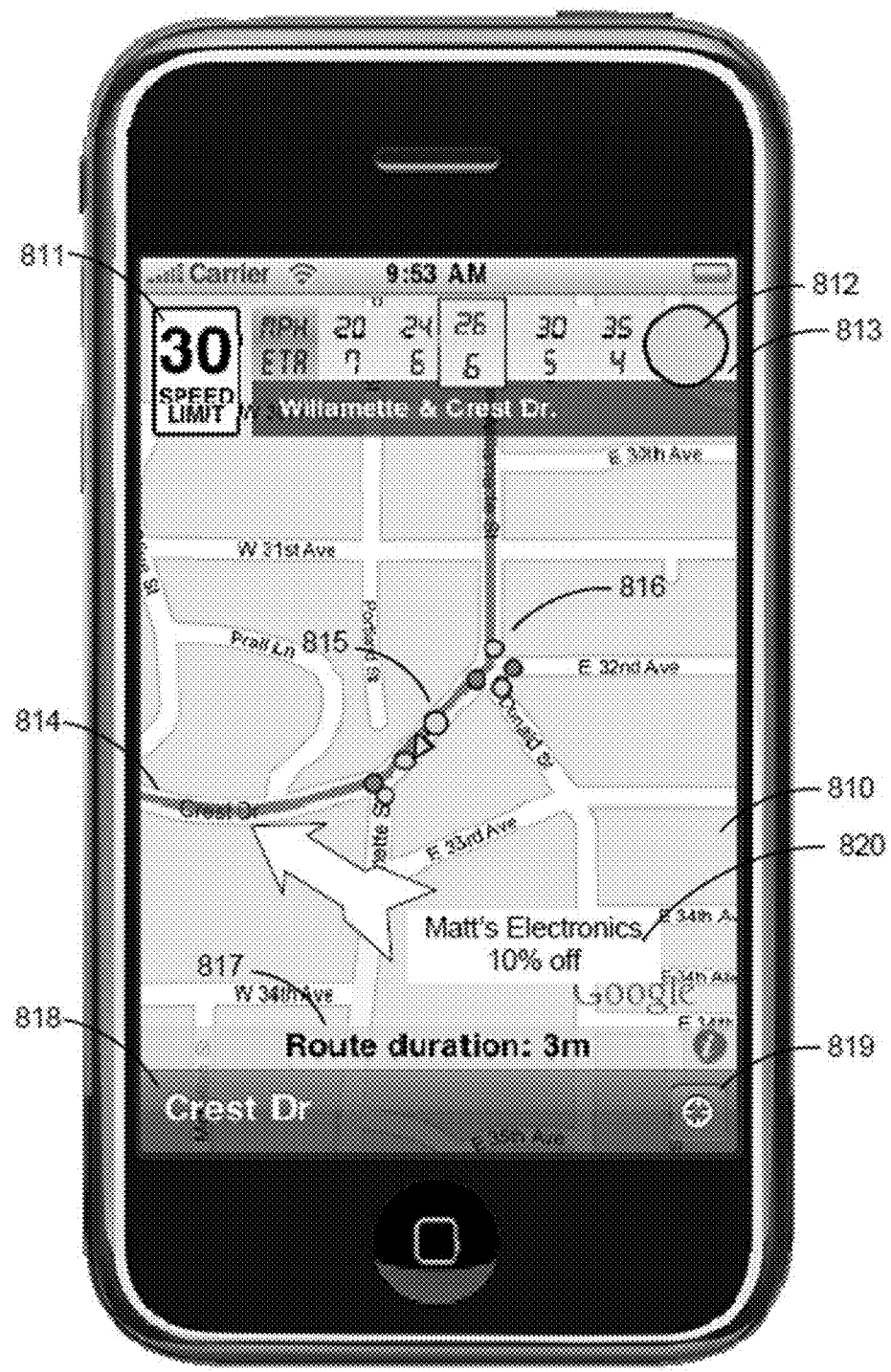
FIG. 8 is a routing display in accordance with an embodiment described herein.
Figure 9:
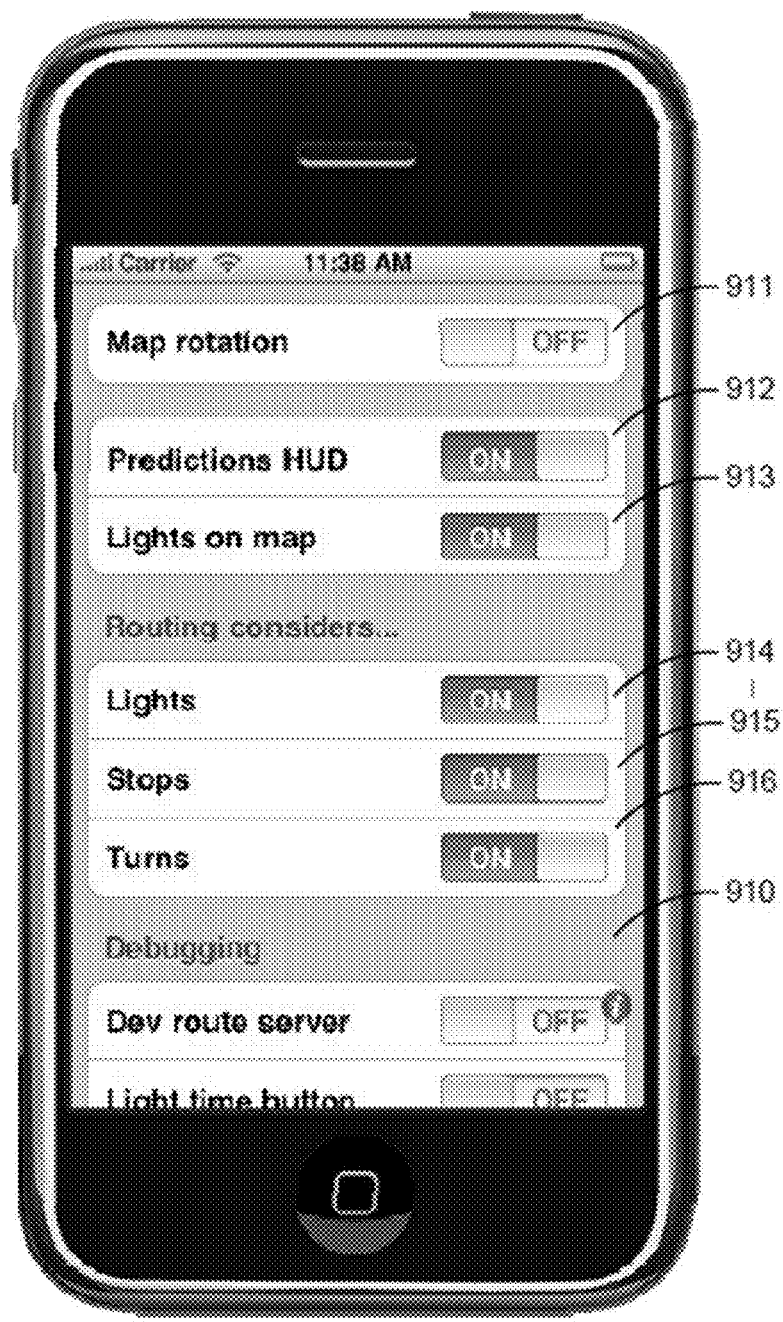
FIG. 9 is a settings display in accordance with an embodiment described herein.

Referring now to FIGS. 7-9, the user interface 112 of user device 112 from FIG. 2 is implemented via a display system that includes a destination display 710 shown in FIG. 7, a routing display 810 shown in FIG. 8, and a settings display 910 shown in FIG. 9.

Specifically, destination display 710 is configured to be a starting place for a driver's use of the system. A search bar 711 allows a user to enter a new destination by entering text to represent a street address, intersection, or business name; alternatively the system allows a user to select a destination from a list of previous destinations 712. In one embodiment, if no destination is selected, the system will be in a "cruising" mode in which it is assumed that the driver will remain traveling as straight as possible; once the driver turns, the system again assumes that the driver will travel as straight as possible.

Upon user selection of route button 713, user device 110 switches to routing display 810 shown in FIG. 8. Routing display 810 is configurable to show a user's current position, starting location and ending location, as well as speed, traffic light and route information. A speed limit indicator 811 shows the speed limit at the driver's current location, based on known data as discussed above. This indicator normally has a white background, but in one embodiment gradually turns to red as the driver's speed exceeds the legal limit. Also provided are a traffic signal indicator icon 812 and an information bar 813. Indicator icon 812 is intended to be large enough for a driver to easily see at a quick glance, and is color-coded to show the state of an upcoming traffic light. In one embodiment, the color coding relates to the current state of the light; in another embodiment the color coding relates to the system's prediction as to whether an upcoming traffic light will be red or green upon the user's arrival. In one embodiment, predictions of the state of an upcoming light may be more or less certain, as discussed above, and the icon will be colored more intensely to show a strong prediction and in a more faded manner to show a weak prediction. Information bar 813 is also color coded, with a background color indicating both a predicted state of the light and confidence in that prediction at the time the user is expected to arrive. The user's actual speed is shown by a surrounding box and a range of speeds surrounding the current speed limit is also displayed. The ETA in this instance indicates that the user would arrive at the light in seven seconds if traveling at 20 mph, as opposed to six seconds at the driver's current rate of 26 mph. The name of the upcoming intersection is also provided at the bottom of bar 813. Drivers can use bar 813 to determine, for example, whether to slow down because the light will be red at the time of arrival regardless of the current speed. Display 810 also shows the states of other nearby traffic signals (e.g., 816), the driver's current location 815, and the selected route 814. The duration of the route is also shown 817, as well as the destination 818. In some circumstances in which a user has moved the map display so that the current location 815 is off the screen or perhaps disabled indication of the current location, user tracking button 819 allows the user to once again display current location 815.

In another embodiment, routing display 810 includes an indicator that displays the time remaining before an upcoming light changes state. If the upcoming light is changing to red and there is time to spare, the driver would, among other things, be able to save fuel by driving only as fast as necessary to pass the light in time. If the timer indicates that the driver will not reach the green light, the driver may slow down to save fuel since he will be stopping at the red light regardless of the speed he travels. A timer that shows how long until a light turns green can also provide impetus for a driver to slow down. A driver may be inclined to slow down and save fuel if he knows that he will still arrive at the next light by the time it turns green.

Figure 11:
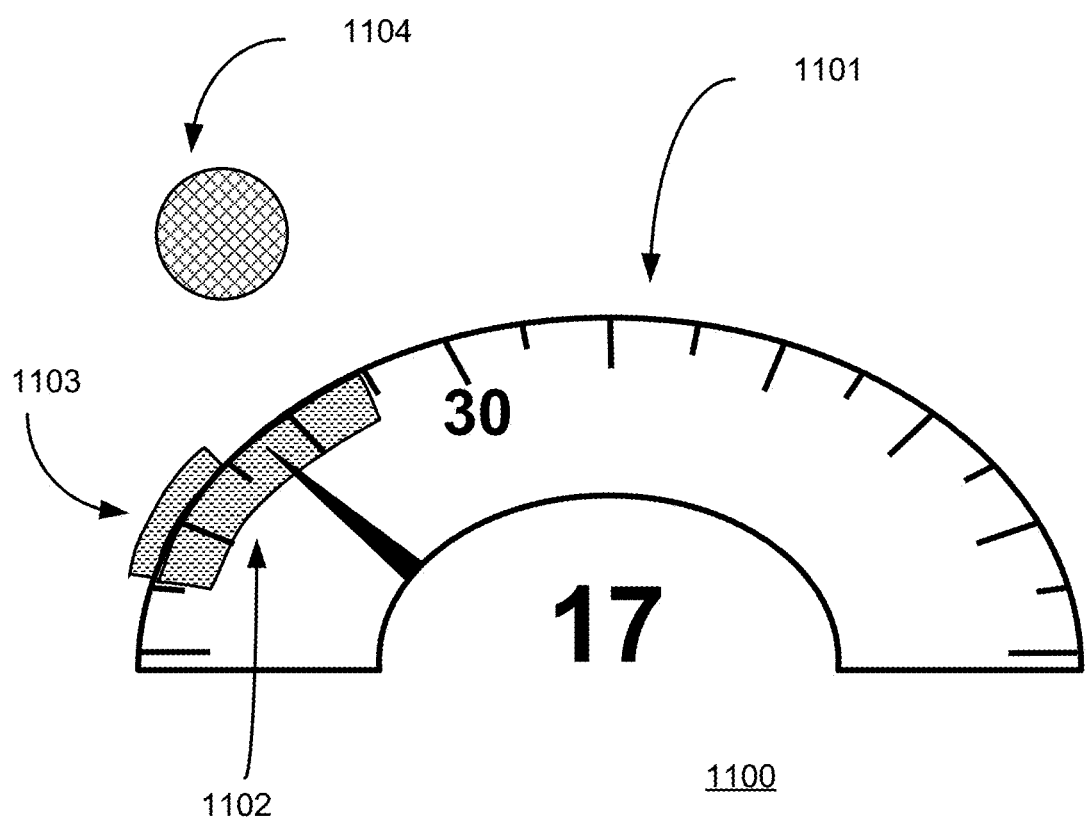
FIG. 11 is a speed display in accordance with an embodiment described herein.

In another embodiment, user device 110 provides access to a speed display 1100 FIG. 11 that contains a speedometer 1101 with concentric arcs, each individual arc indicating the range of speed required to pass through a given number of consecutive traffic signals. The innermost arc 1102 represents the speed range required to pass through the first traffic signal in the vehicle's path. Each subsequent arc represents the speed range required to pass through each subsequent traffic signal in the vehicle's path in addition to all previous consecutive traffic signals along the path. For example, the outer speed recommendation indicator 1103 is the second arc depicted, and thus represents the speed range required to pass through both the first and the second traffic signals in the vehicle's path. In typical applications, only the upcoming two traffic signals would be of interest, but if an application should call for it, additional subsequent signals could similarly be taken into account. In such case, the $n^{th}$ speed recommendation indicator would represent the speed range required to pass through n consecutive traffic signals along the vehicle's path without stopping. Such a display 1100 allows a driver to know how best to get into a so-called "green wave," i.e., a speed that is essentially synchronized with the timing pattern of upcoming traffic signals.

As with the routing display, the speed display 1100 includes a large circular icon 1104 representing the state of the next upcoming traffic light; in one aspect it displays the current state and in another aspect it displays the predicted state at the time the driver is expected to reach it. Note that for the purposes of this disclosure, the cross-hatching pattern within the circular icon 1104 represents the color red, indicating a red light at the upcoming traffic signal. In another aspect the color coding of the speedometer arcs 1102 and 1103 indicates the expected state of the light upon arrival. Note that for the purposes of this disclosure, the polka dot hatching pattern within the arcs 1102 and 1103 represents the color green, indicating the expectation that the traffic signals will present a green signal when traversed at the recommended speed range. In yet another aspect, the intensity of the color in the bar or in the circle indicates the strength of the prediction, with relatively strong predictions corresponding to intense color and less certain predictions corresponding to more faded colors.

Figure 12:
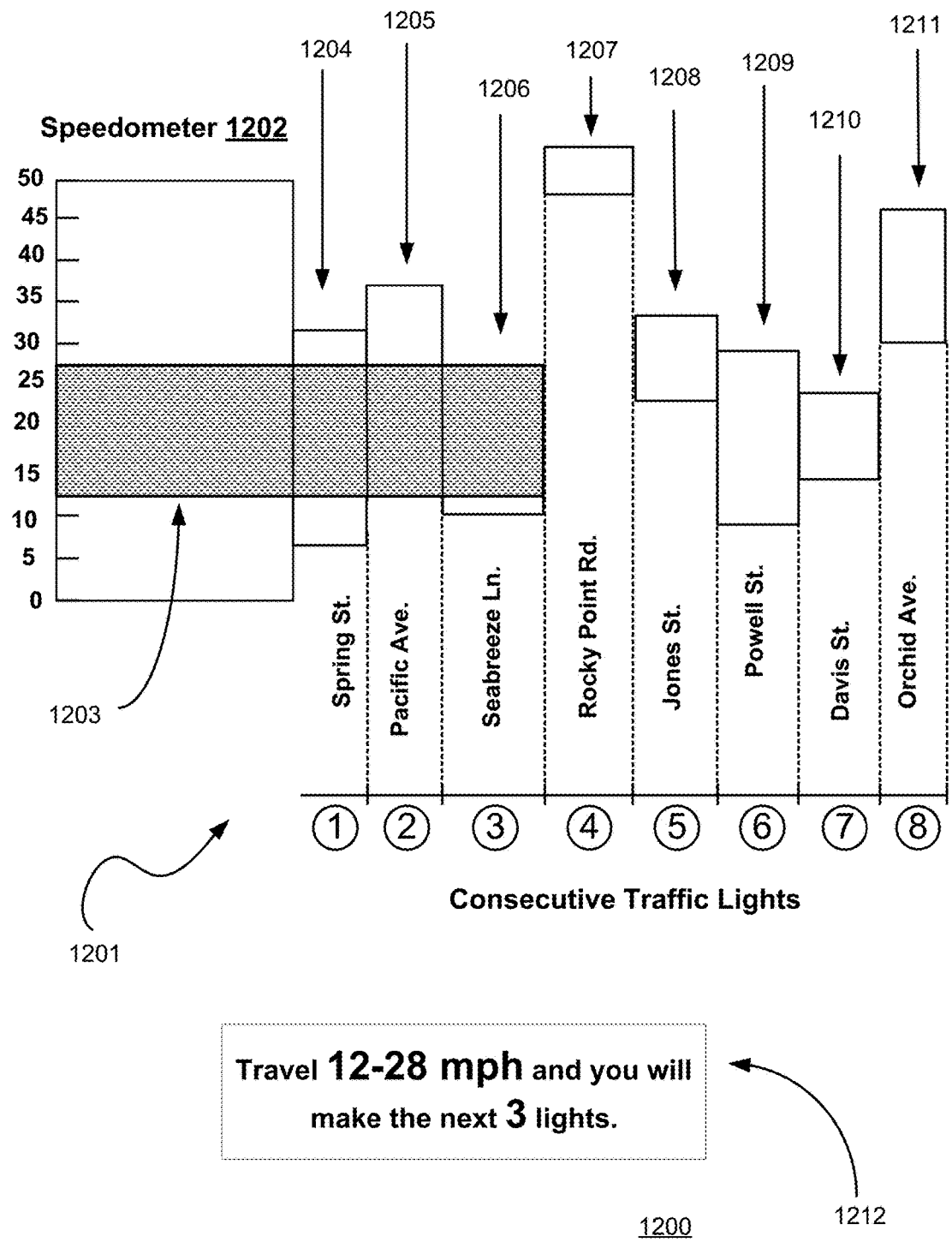
FIG. 12 is an alternate speed display in accordance with an embodiment described herein.

FIG. 12 is another embodiment of a speed display 1200. This embodiment may not be suitable for typical applications due to the complicated nature of the display but may be helpful, for instance, for private ambulances, buses, commercial delivery trucks and the like with professional drivers but without a capability to influence upcoming traffic signals. This display contains a bar graph 1201 for which the x-axis lists streets at which traffic signals reside and the y-axis is speed required to pass through a traffic light. The streets at which the traffic signals are located are listed in sequential order along the route which the user device 110 is traveling. If the user has not specified a destination, but has selected the "cruising" mode, the route is assumed to be straight down the street that the user is currently traveling on. The bar graph 1201 includes speed range recommendations to traverse upcoming traffic signals located at the cross streets indicated below said recommendations. For example, speed recommendation 1204 indicates the range of speed required to traverse the immediately upcoming traffic light located at Spring St. without stopping at said traffic light. Speed recommendation 1205 indicates the range of speed required to traverse the second upcoming traffic light located at Pacific Ave. without stopping at the Pacific Ave. traffic light. Speed range recommendation 1206 indicates the range of speed required to traverse the third traffic light along the vehicle's route at Seabreeze Ln. This pattern continues for speed recommendations 1207-1211. The speed range at which the maximum number of consecutive traffic signals can be successfully traversed 1203 is indicated by the polka dot hatching pattern within speedometer 1202. Note that for the purposes of this disclosure, the polka dot hatching pattern within the arcs 1102 and 1103 represents the color green, indicating the expectation that the traffic signals will present a green signal when traversed at the recommended speed range. Finally, the status notification 1212 indicates the speed range and number of consecutive lights that are traversable without stopping at a red light. The status notification 1212 can be displayed in as text or announced aloud. For example, the display may read: "Travel 12-28 mph and you will make the next 3 lights."

Figure 13:
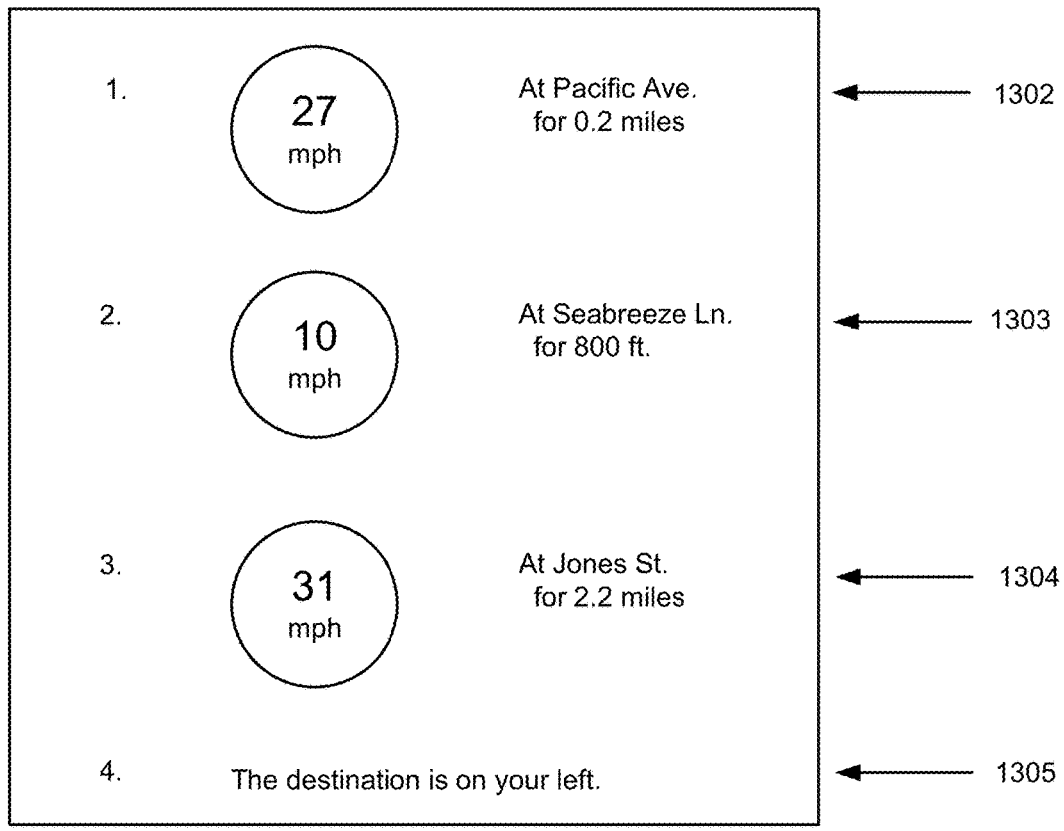
FIG. 13 is an additional speed display in accordance with an embodiment described herein.

Yet another embodiment of a speed display system 1300, which may be suitable in certain applications involving qualified drivers, is depicted in FIG. 13. Speed recommendation display 1301 is modeled after a set of routing instructions in that it is displayed in a step by step instructional format. This display contains instructions regarding speed changes over specified distances, times, and locations. By adhering to the instructions given by speed recommendation display 1301, the driver will not be required to stop at any red traffic signals. In this particular embodiment, speed recommendations are given alongside corresponding locations and distances. For example, the first speed recommendation 1302 suggests that the driver travel at a speed of 27 mph for 0.2 miles after reaching Pacific Ave. The second speed recommendation 1303 applies when the driver reaches Seabreeze Ln. Speed recommendation 1303 suggests that the driver travel at a speed of 10 mph for 800 feet after reaching Seabreeze Ln. The third speed recommendation 1304 applies when the driver reaches Jones St. Speed recommendation 1304 suggests that the driver travel at 31 mph for 2.2 miles after Jones St. Finally, arrival notification 1305 alerts the driver that the destination has been reached. Note that in further embodiments of speed recommendation display 1301, routing instructions may also be incorporated along with speed recommendations. For example, an additional numbered recommendation might read "Turn right at Larkin Ave. in 1.1 miles."

As noted above, system 100 is also capable of determining and storing how certain indicators affect the behavior of drivers. In one embodiment this data is used to determine whether the indicator should be displayed to the driver in the future. If an indicator promotes unsafe behavior, it may no longer be shown to the driver. On the other hand, if an indicator causes a driver to adhere to the speed limit, it will continue to be shown. For example, if displaying the time remaining before a light turns red causes the driver to go as fast as is necessary to reach the light in time, the indicator may no longer be shown. Similarly, if the information bar 813 indicates that the traffic light will be green when the driver reaches it if the driver exceeds the speed limit, the driver may choose to travel faster than the speed limit. Given a driver's history, the system can choose to not display certain indicators that are found to promote unsafe driving. Rules determining which indicators should be displayed can be applied to multiple drivers or to specific drivers based on their actions. In some embodiments, the user may be given a choice of whether indicators promoting unsafe behavior such as speeding should be displayed or suppressed.

In one embodiment, routing display 810 also includes location-based advertisements 820, such as a coupon and prominent arrow showing the location of an advertiser. Selection of an advertisement 820 is, in various embodiments, dependent upon context. In one embodiment, an advertisement is selected for display based on the destination that the user has selected. In the example shown in FIG.

8, a coupon for an electronics store is displayed. This may be in response to the user entering a destination location that is a competing electronics store, for instance. In another embodiment, location-based advertisements are selected based on the projected path of the user. In other embodiments, location-based advertisements are selected based on keywords used while in the destination display 710, recent web searches, user profile information and other characteristics that can be gleaned from historical use of user device 110.

In one embodiment, advertisements based only on proximity of the user's location, or a proposed route, to a sponsored business are displayed on user device 110. Thus, a user seeking an electronics store may be provided with an advertisement for a coffee shop not far from the proposed route to the electronics store. In some embodiments, other information relating to destinations is provided as well. As one example, if a destination is an electronics store and that store will be closed at the expected arrival time of the user, a warning message to that effect is displayed on the user device 110. Likewise, if the user has input a parking facility as a destination and that facility is full, such information is provided on the user device 110. In these instances, in certain embodiments alternate destinations are suggested via display on user device 110 (e.g., a store that will still be open or a parking facility that is not full). Display of such suggested destinations is in some embodiments influenced by sponsorship such that certain alternate destinations are favored over others based on such destinations paying for that benefit.

Referring now to FIG. 9, a settings display 910 provides user selection of various display-related features. A map rotation control 911 determines whether the displayed map is oriented to the direction of travel or in a conventional "North-up" mode. A "Predictions HUD" control 912 determines whether the traffic signal indicator 812 and color bar 813 are displayed to the user. "Lights on map" control 913 is used to enable or disable display of traffic signals, e.g., 816. In addition to display-oriented controls such as these, settings display 819 provides controls that determine the behavior of routing system 100. "Lights" control 914 is used to determine whether delays due to traffic signals will be considered in estimating transit times. "Stops" control 915 likewise relates to whether delays for stop signs will be considered. "Turns" control 916 similarly enables or disables delay calculations for time spent making right or left turns.

Figure 14:
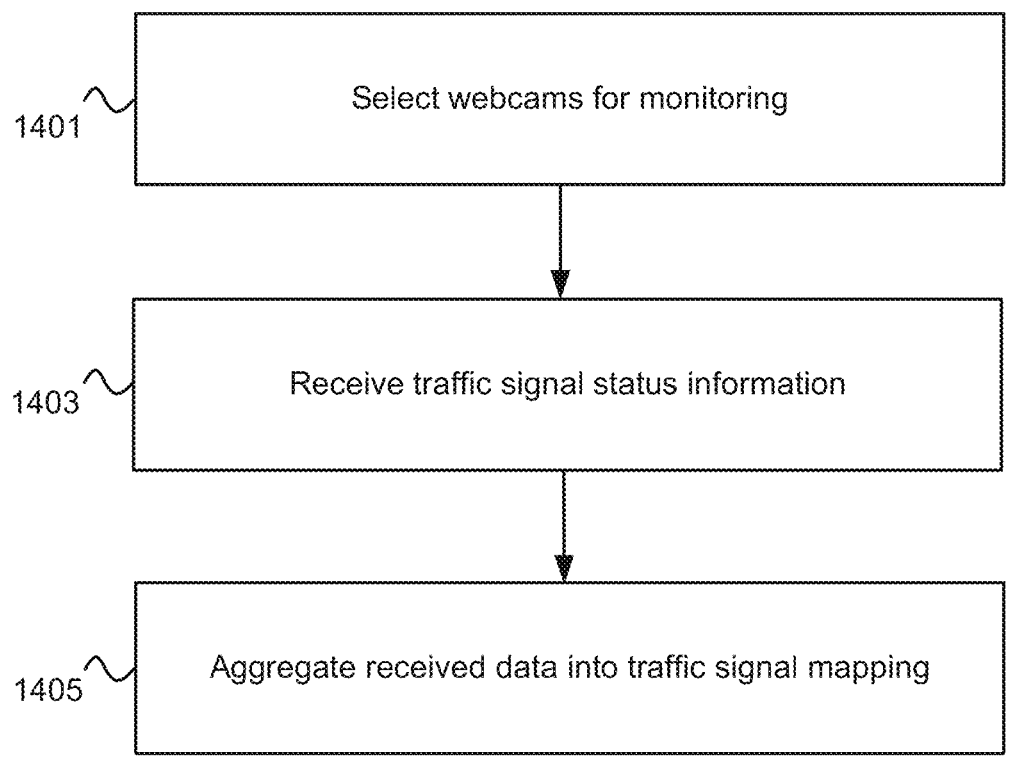
FIG. 14 is a flow chart illustrating a method of generating a traffic signal mapping, in accordance with an embodiment described herein.

FIG. 14 is a flow chart illustrating a method of generating a traffic signal mapping for a traffic signal 130. In one embodiment, the traffic signal interaction module 122 uses image masking to detect traffic signals in public webcam images, as discussed above with respect to FIG. 4. Alternatively, the traffic signal interaction module 122 uses supervised machine learning to train a computer model to predict whether a public webcam feed contains one or more traffic signals. In step 1401, the traffic signal interaction module 122 selects webcams for monitoring responsive to determining that the rectangle overlaying the image mask corresponds to a traffic signal, or, in another embodiment, responsive to the computer model determining that the public webcam feeds contain one or more traffic signals.

In step 1403, the traffic signal mapping module 126 receives traffic signal status information from the traffic signal interaction module 122 and/or from a user through a user device 110. For example, the traffic signal status information might include a notification that the status of the traffic signal 130 has changed and a time stamp reflecting the time at which the status change occurred. In some embodiments, the information includes an indication of the reason for the status change, such as normal traffic flow or as a result of an emergency vehicle or pedestrian signal. In still other embodiments, data used for traffic signal mapping is gathered by scanning the video frames for images indicating vehicle movement, or lack of movement. This option can be used when no traffic signal is visible in the webcam.

In step 1405, the traffic signal mapping module 126 aggregates the received traffic signal status information to generate a traffic signal mapping for the traffic signal 130. In one embodiment, the traffic signal mapping indicates the signal status of the traffic signal 130 and timing and types of signal changes that occur at different times of the day and different days of the week. For example, the portion of the mapping representing Sunday morning from 7:00-9:00 AM might contain different signal status and timing information than the portion of the mapping representing the same time on Tuesday mornings, reflecting a lower likelihood of traffic on weekend mornings than during morning rush hour and thus a different length of time between updates of the status of the traffic signal 130. The traffic signal mapping is sent to the database 129 for storage and periodically updated as additional signal status information for the traffic signal 130 is received.

FIG. 15 is an exemplary image captured by a public webcam 140 for use in generating a traffic signal mapping. The webcam 140 is mounted on a traffic signal structure or other building or structure and captures and displays a live feed to users accessing the feed through a user device 110. The captured image displays two traffic signal structures 1505 and 1510 at consecutive intersections along a road, each containing multiple traffic signals. For example, traffic signal structure 1505, located at intersection 1605, contains traffic signals 1506, 1507, and 1508. In the displayed embodiment, traffic signals 1506-1508 are green, indicating that vehicle 1520 is permitted to flow through the intersection at Main Street and that pedestrians are permitted to cross from one side of Main Street to the other. Subsequent traffic signals 1511 and 1512 are red, indicating that vehicle 1530 is not permitted to drive through the intersection. Responsive to the status of the traffic signals changing (e.g., traffic signal 1506 changing from green with a green arrow to green with a yellow arrow), the traffic signal interaction module 122 sends a notification to the traffic signal mapping module 128. In some embodiments, the traffic signal mapping module 128 also receives traffic signal status information from a user of through user interface 112 of the user device 110. For example, an individual hired to monitor the status of traffic signals on traffic signal structures 1505 and 1510 might provide input indicating that traffic signals 1511 and 1512 have changed from red to green.

In some embodiments, the traffic signal interaction module 122 scans the video frames captured by the public webcam 140 for movement, or lack of movement, by vehicles 1520 and 1530 and uses movement data in generating traffic signal mappings for traffic signals 1506-1508, 1511, and 1512.

As noted above, even for intersections for which the webcam feeds do not directly show traffic signals, they may still indicate the state of traffic signals. For example, heavily used intersections that typically have traffic moving in the green light direction can indicate, by movement of vehicles vertically as opposed to horizontally in a video, which signals are green and which are red. This information is then used as a proxy for traffic signal status.

Figure 16:
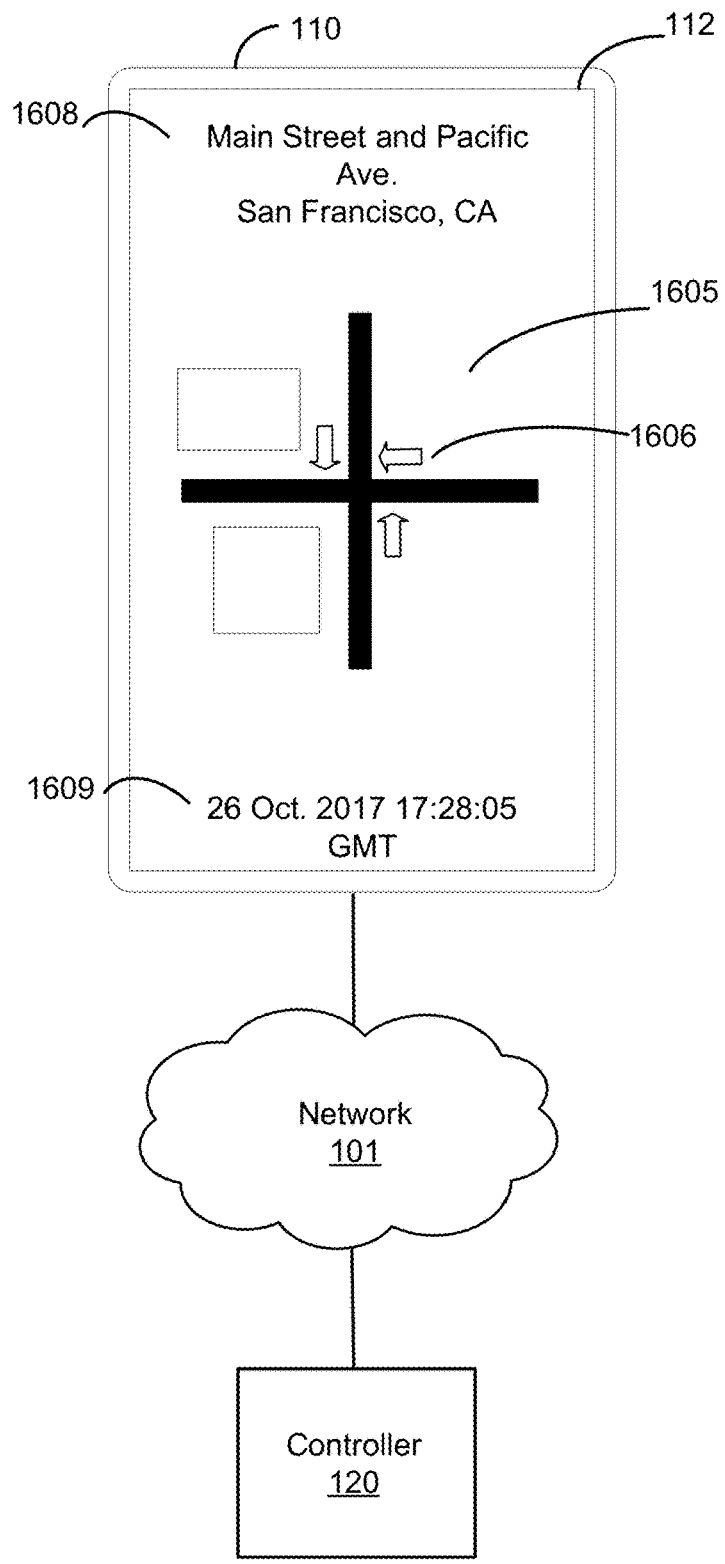
FIG. 16 is an example user interface illustrating an intersection and prompting a user to select the direction from which she is viewing a traffic signal, in accordance with an embodiment described herein.

Referring now to FIG. 16, a user device 110 is provided with a user interface 112 to allow the user to input, in real time, status of traffic signals (e.g., 1506, 1507). User device 110 is connected, for instance via the network 101, with the controller 120. The user interface 112 also includes the location 1608 of the traffic signal(s) that the user is monitoring and, optionally, the current date and time 1609. The display can be chosen from numerous options as applicable to the traffic signal.

The GPS receiver 111 identifies the location of the user device 110 from GPS satellite signals received at the user device 110 and transmits the current location to the traffic signal interaction module 122, which determines a corresponding traffic signal or set of signals from which the user can select via the user interface 112. For example, responsive to the GPS receiver 111 identifying the current location of the user device 110 at the intersection of Main Street and Pacific Avenue in San Francisco, Calif., the traffic signal interaction module 122 instructs the application to display the intersection 1605 on the user interface 112 along with arrows 1606 allowing the user to indicate the direction from which she is facing the traffic signal structure. In other embodiments, the user identifies his location using other methods, obviating the need for the GPS receiver 111.

Figure 17:
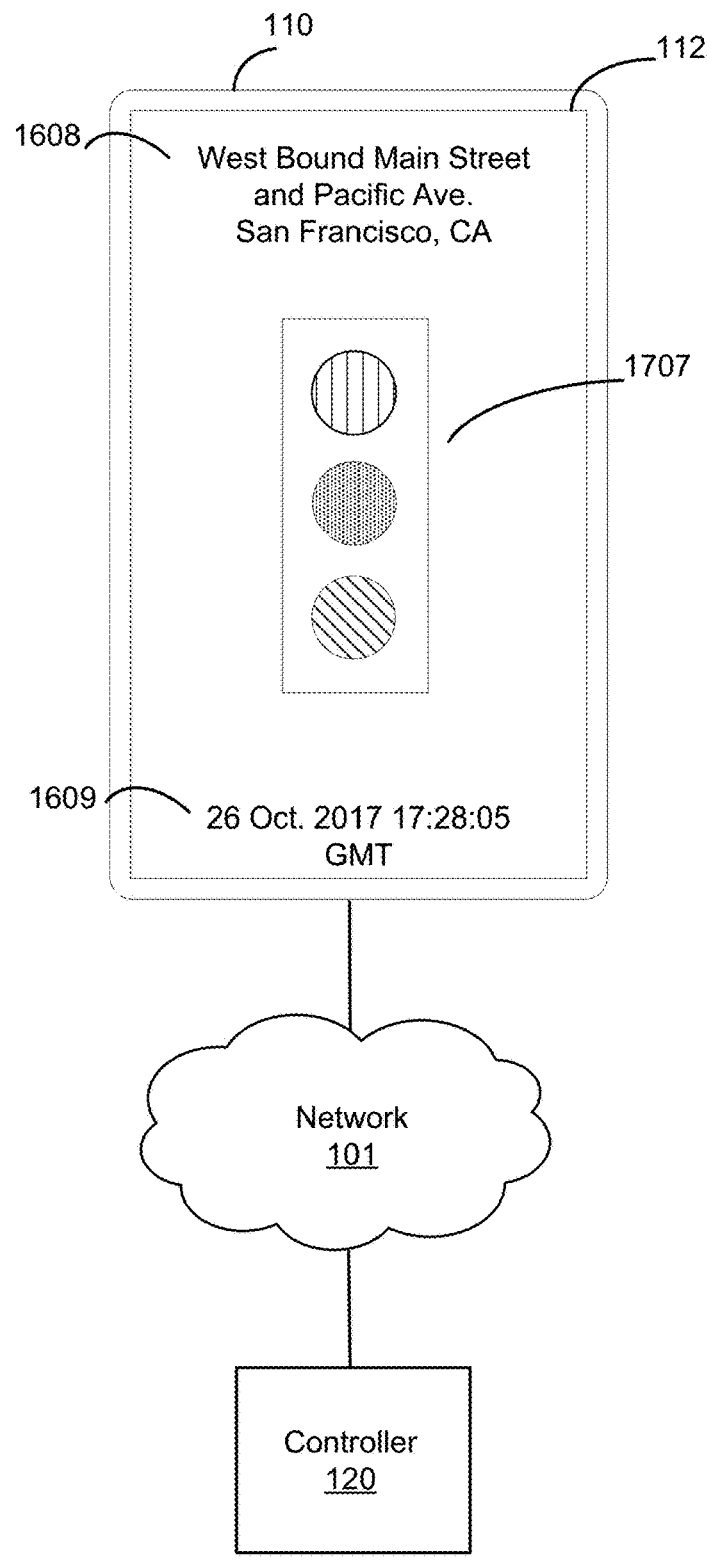
FIG. 17 is an example user interface illustrating a traffic signal icon and prompting the user to provide input indicating the current signal state of the traffic signal, in accordance with an embodiment described herein.

Responsive to the user selecting the direction from which she is facing the traffic signal structure, the traffic signal interaction module 122 determines a traffic signal 1507 to display to the user (i.e., the traffic signal for which the user will provide signal status information). For example, as shown in FIG. 17, the user has selected the arrow 1606 indicating that she is observing the westbound approach to the intersection of Main Street and Pacific Ave. The user interface 112 displays the location 1608 in the top portion of the display along with an icon 1707 corresponding to the traffic signal 1507. The user is prompted to indicate the current state of the traffic signal 1507 and provides input by selecting the portion of the icon 1707 corresponding to the current signal state. While a single icon 1707 corresponding to a single traffic signal 1507 is displayed in FIG. 17, it would be clear to one of skill in the art how to modify the present embodiment to allow a user to provide input for multiple traffic signals. In other embodiments, the display presented to the user is independent of the light and direction selected.

Figure 18:
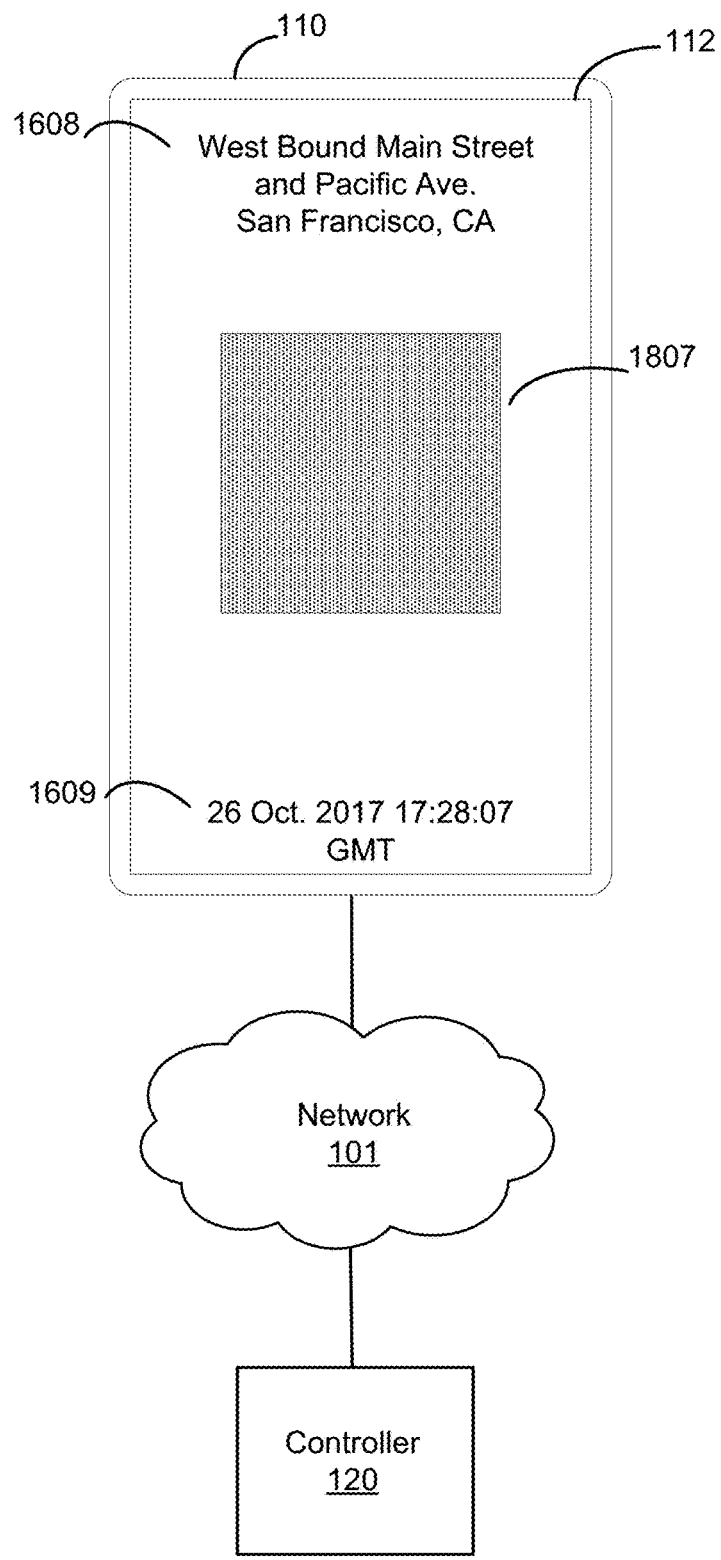
FIG. 18 is an example user interface illustrating an icon corresponding to the subsequent signal state of the traffic signal and prompting the user to provide input when the traffic signal status changes to the subsequent state, in accordance with an embodiment described herein.

Responsive to the user indicating the current state of the traffic signal 1507, the traffic signal interaction module 122 determines the subsequent state of the traffic signal and displays a representation of the subsequent state as an icon 1807 on the user interface 112, as shown in FIG. 18. For example, assume that the user selected the bottom portion of the icon 1707 indicating that the current state of the traffic signal 1507 is green. Based on the user input, the traffic signal interaction module 122 determines that the subsequent state of the traffic signal 1507 will be yellow and displays on the user interface a yellow icon 1807, prompting the user to select the icon when the traffic signal 1507 turns yellow. In some embodiments, the user interface 112 also includes icons that allow the user to select the reason for the change of traffic signal status (e.g., as a result of an emergency vehicle passing through the traffic signal 1507). In some embodiments, the user interface 112 displays a message and/or an icon prompting the user to confirm the input (e.g., confirming that the traffic signal 1507 turned from green to yellow). Responsive to the user providing confirmation of the status change through the user interface 112, the input is transmitted through the network 101 to the controller 120 for mapping of the traffic signal 1507. In practice, it is found that user devices rarely are synchronized such that the exact time of a signal transition can be known among different devices without use of a common reference. Therefore, in some embodiments, user device 110 communicates with an external source in order to establish a common and authoritative time, e.g., for when a traffic signal transitions.

The foregoing description describes embodiments in which signal state is used to generate a mapping for a traffic signal. In other embodiments, motion is used as a surrogate for traffic signal state. In one such embodiment, the traffic signal interaction module 122 scans the video frames of webcam feeds for images indicating movement, or lack of movement, of vehicles in one direction or another. Where this option is available, it may be preferential to identification of the "true" state of the traffic signal because at such busy intersections, it may be several seconds after a green signal begins before vehicular and pedestrian traffic clears the intersection sufficiently to allow vehicular movement pursuant to the green signal.

The above disclosure has been described in particular detail with respect to several embodiments. Those of skill in the art will appreciate that the disclosed systems and methods may be practiced in other embodiments. The particular naming of the components, capitalization of terms, the attributes, data structures, or any other programming or structural aspect is not mandatory or significant, and the mechanisms that implement any embodiment or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain disclosed aspects include process steps and instructions described herein in the form of an algorithm. It should be noted that the process steps and instructions of the embodiments could be embodied in part in software, and when so embodied, could be downloaded to reside on and be operated from different platforms used by real time network operating systems.

The disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the disclosed embodiments are not described with reference to any particular programming language. It is appreciated that a variety of programming languages may be used to implement the teachings as described herein, and any references to specific languages are provided for enablement and best mode.

The disclosed embodiments are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention.

What is claimed is:

1. A for providing visual display of suggested speeds on a user device, the method comprising:
   receiving, at a system including one or more processors, a current location and a direction of travel from the user device in a vehicle;
   receiving traffic signal information comprising a current status of a plurality of traffic signal devices;
   determining an optimal speed profile for the vehicle based on the current location,
      the direction of travel, and the traffic signal information, the optimal speed
      profile comprising a range of speeds required to pass through at least two consecutive traffic signal devices without stopping;
      sending the optimal speed profile for the vehicle to the user device; and
   displaying, on the user device, an indication of the optimal speed profile.

2. The method of claim 1, wherein displaying an indication of the optimal speed profile on the user device comprises dynamically displaying a traffic signal indicator for each traffic signal device of the at least two consecutive traffic signal devices, the traffic signal indicator indicating a current status of the traffic signal device.

3. The method of claim 1, wherein the range of speeds is capped at a maximum speed based on at least one of a speed limit at the current location of the user device in the vehicle and a current speed of the vehicle received from the user device in the vehicle.

4. The method of claim 1, wherein displaying an indication of the optimal speed profile on the user device comprises dynamically displaying a traffic signal indicator for each traffic signal device of the at least two consecutive traffic signal devices, the traffic signal indicator indicating a predicted status of the traffic signal device at a time at which the vehicle is predicted to reach the traffic signal device based on the optimal speed profile.

5. The method of claim 4, wherein an intensity of the indication of the optimal speed profile displayed on the user device indicates a certainty of the predicted status of the traffic signal device, a higher intensity of the indication of the optimal speed profile indicating a more certain predicted status of the traffic signal device.

6. The method of claim 1, wherein displaying an indication of the optimal speed profile on the user device comprises dynamically displaying a traffic signal indicator for each traffic signal device of the at least two consecutive traffic signal devices, the traffic signal indicator indicating a predicted status of the traffic signal device at a time at which the vehicle is predicted to reach the traffic signal device based on a current speed of the vehicle received from the user device in the vehicle.

7. The method of claim 6, wherein an intensity of the indication of the optimal speed profile displayed on the user device indicates a certainty of the predicted status of the traffic signal device, a higher intensity of the indication of the optimal speed profile indicating a more certain predicted status of the traffic signal device.

8. The method of claim 1, wherein displaying an indication of the optimal speed profile on the user device comprises dynamically displaying an indicator of time remaining before the status of at least one of the at least two consecutive traffic signal devices changes.

9. The method of claim 8, further comprising dynamically displaying an indicator of an expected arrival time at the at least one of the at least two consecutive traffic signal devices based on a received current speed of the vehicle from the user device in the vehicle.

10. The method of claim 1, wherein the optimal speed profile further comprises a speed display comprising a plurality of concentric arcs, each arc of the plurality of concentric arc indicating the range of speeds required to pass through the least two consecutive traffic signal devices without stopping.

11. The method of claim 1, wherein sending the travel route and the optimal speed profile for the vehicle to the user device comprises:
   sending a plurality of displays displaying the travel route and the optimal speed profile to the user device;
   tracking an adherence to speed limits of the vehicle based on the display sent to the user device;
   identifying a safest display of the plurality of displays based on the tracked adherence to speed limits of the vehicle; and
   sending the safest display to the user device in future iterations of the method.

12. The method of claim 1, further comprising:
   determining, by the system, that one or more public webcams capture and display a traffic signal device;
   monitoring the one or more public webcams to determine traffic signal device status information, the traffic signal device status information including one or more changes in a signal state of the traffic signal device and times at which the changes occurred; and
   aggregating the traffic signal device status information to generate a traffic device signal mapping for the traffic signal device.

13. The method of claim 1, further comprising:
receiving, from a user device, user input indicating one or more changes in the signal state of the traffic signal device; and
generating a traffic device signal mapping for the traffic signal device based on the user input.

14. The method of claim 12, further comprising using traffic signal device status information for one or more traffic signal devices to obtain traffic signal device status information for one or more additional traffic signal devices.

15. The method of claim 12, further comprising determining a travel route for a vehicle based at least in part on traffic signal device mappings for traffic signal devices along one or more candidate routes from a current location of the vehicle to a destination location.

16. The method of claim 12, wherein the traffic signal device mapping includes:
data describing the status of the traffic signal device at different times of day and different days of a week; and
timing information indicating a length of time that the traffic signal device remains in various states.

\* \* \* \* \*